United States Patent
Fujii

(10) Patent No.: US 10,649,620 B2
(45) Date of Patent: May 12, 2020

(54) IMAGE FORMING APPARATUS, PROCESSING DEVICE, AND NON-TRANSITORY COMPUTER-READABLE MEDIUM

(71) Applicant: FUJI XEROX CO., LTD., Minato-ku, Tokyo (JP)

(72) Inventor: Masaru Fujii, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 424 days.

(21) Appl. No.: 14/296,599

(22) Filed: Jun. 5, 2014

(65) Prior Publication Data

US 2015/0046864 A1 Feb. 12, 2015

(30) Foreign Application Priority Data

Aug. 9, 2013 (JP) .................................. 2013-167137

(51) Int. Cl.
*G06F 3/0482* (2013.01)
*G06F 3/0488* (2013.01)
(Continued)

(52) U.S. Cl.
CPC ........ *G06F 3/0482* (2013.01); *G06F 3/04842* (2013.01); *G06F 3/04886* (2013.01); *G06K 15/002* (2013.01); *H04N 2201/0094* (2013.01)

(58) Field of Classification Search
CPC .......................................... G06F 3/048–04886
See application file for complete search history.

(56) References Cited

U.S. PATENT DOCUMENTS 6,232,972 B1 * 5/2001 Arcuri ................... G06F 3/0482
715/815
6,624,831 B1 * 9/2003 Shahine ................ G06F 3/0482
715/811
(Continued)

FOREIGN PATENT DOCUMENTS

JP 7219743 A 8/1995
JP 9311772 A 12/1997
(Continued)

OTHER PUBLICATIONS

Communication dated Mar. 31, 2015, issued by the Japan Patent Office in corresponding application No. 2013-273531.
(Continued)

*Primary Examiner* — Matthew Ell
*Assistant Examiner* — Linda Huynh
(74) *Attorney, Agent, or Firm* — Sughrue Mion, PLLC

(57) ABSTRACT

Provided is an image forming apparatus including a processing unit that performs a predetermined process for forming an image, a display unit that displays a first screen for displaying Q setting items out of P setting items for setting conditions in which the processing unit performs the process to set the Q setting items or a second screen for displaying R setting items out of the P setting items to set the R setting items, and a switching unit that switches a display screen to be displayed on the display unit between the first screen and the second screen based on a user's instruction, wherein all of the P setting items are capable to be set using the Q setting items displayed on the first screen and the R setting items displayed on the second screen.

21 Claims, 27 Drawing Sheets

(51) Int. Cl.
*G06F 3/0484* (2013.01)
*G06K 15/00* (2006.01)

(56) References Cited

U.S. PATENT DOCUMENTS

| | | | |
|---|---|---|---|
| 7,636,040 B2* | 12/2009 | Yoshida | G06F 3/1204 340/461 |
| 2007/0296992 A1* | 12/2007 | Tanaka | G06F 3/1204 358/1.13 |
| 2008/0085132 A1* | 4/2008 | Asada | G03G 15/5016 399/83 |
| 2008/0209449 A1* | 8/2008 | Maehira | G06F 9/44505 719/321 |
| 2008/0294983 A1* | 11/2008 | Hoshino | H04N 1/00222 715/273 |
| 2009/0316184 A1* | 12/2009 | Ohyama | G06F 3/1205 358/1.15 |
| 2009/0323101 A1 | 12/2009 | Saito | |
| 2010/0115464 A1* | 5/2010 | Harada | G06F 3/1205 715/810 |
| 2010/0199211 A1* | 8/2010 | Igawa | G06F 3/0483 715/777 |
| 2010/0271661 A1* | 10/2010 | Ogino | G06F 3/1205 358/1.15 |
| 2010/0271669 A1* | 10/2010 | Yamaguchi | H04N 1/00408 358/474 |
| 2011/0128575 A1* | 6/2011 | Iwata | H04N 1/00416 358/1.15 |
| 2011/0235107 A1* | 9/2011 | Sakata | H04N 1/0035 358/1.15 |
| 2012/0023451 A1* | 1/2012 | Kuroyanagi | G06F 8/38 715/835 |
| 2012/0212761 A1* | 8/2012 | Kuroyanagi | H04N 1/00408 358/1.13 |
| 2012/0218584 A1* | 8/2012 | Nitta | G03G 15/502 358/1.13 |
| 2012/0319939 A1 | 12/2012 | Kawashima et al. | |
| 2012/0324399 A1* | 12/2012 | Katsumata | H04N 1/00474 715/810 |
| 2013/0055124 A1* | 2/2013 | Wang | G06F 3/04817 715/765 |
| 2013/0074008 A1* | 3/2013 | Umezawa | G03G 15/502 715/810 |
| 2013/0254715 A1* | 9/2013 | Park | G06F 3/04817 715/810 |
| 2014/0013254 A1* | 1/2014 | Hosein | G06F 3/04817 715/765 |
| 2014/0013271 A1* | 1/2014 | Moore | G06F 3/0482 715/792 |
| 2014/0022579 A1* | 1/2014 | Edamatsu | G06K 15/1805 358/1.13 |
| 2014/0165006 A1* | 6/2014 | Chaudhri | G06F 3/04817 715/835 |
| 2014/0376017 A1* | 12/2014 | Miyazaki | H04N 1/00411 358/1.13 |
| 2015/0277692 A1* | 10/2015 | Liu | G06F 3/0488 715/835 |

FOREIGN PATENT DOCUMENTS

| | | |
|---|---|---|
| JP | 2008-3649 A | 1/2008 |
| JP | 20109297 A | 1/2010 |
| JP | 20133927 A | 1/2013 |

OTHER PUBLICATIONS

Communication dated Dec. 4, 2017, from the State Intellectual Property Office of People's Republic of China in counterpart Application No. 201410325469.2.
Communication dated Jul. 26, 2018, from the State Intellectual Property Office of People's Republic of China in counterpart Application No. 201410325469.2.

* cited by examiner

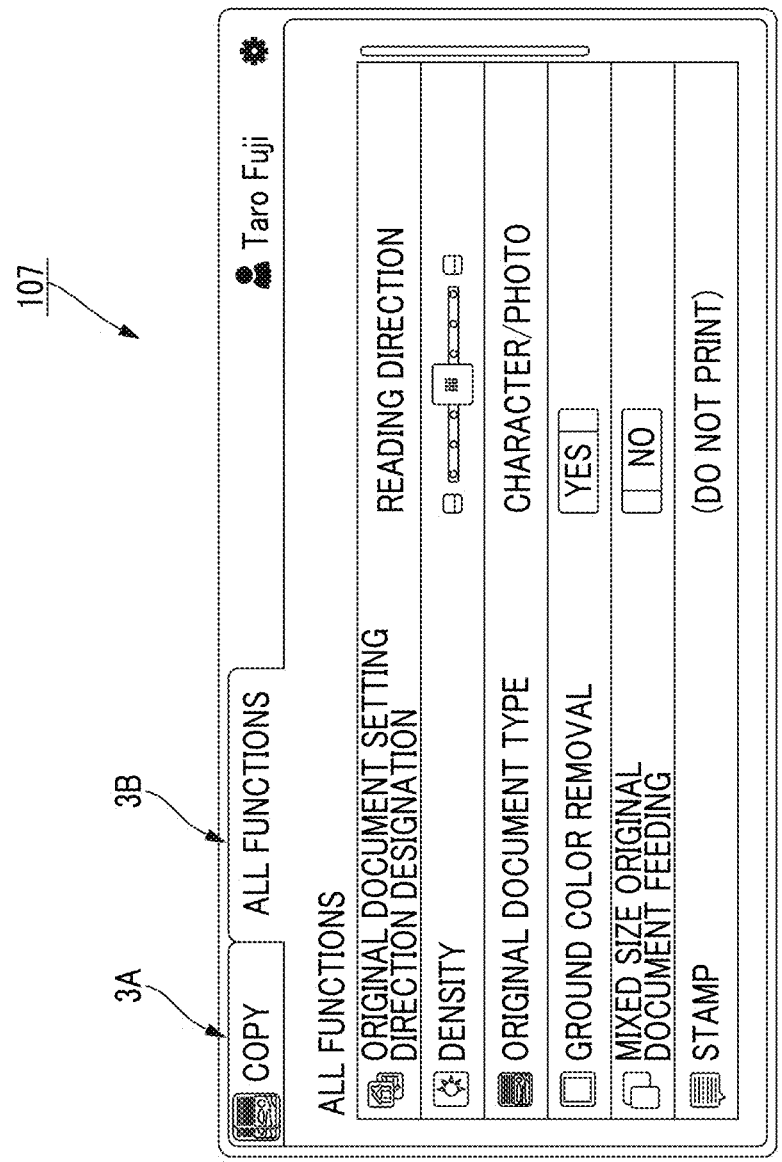

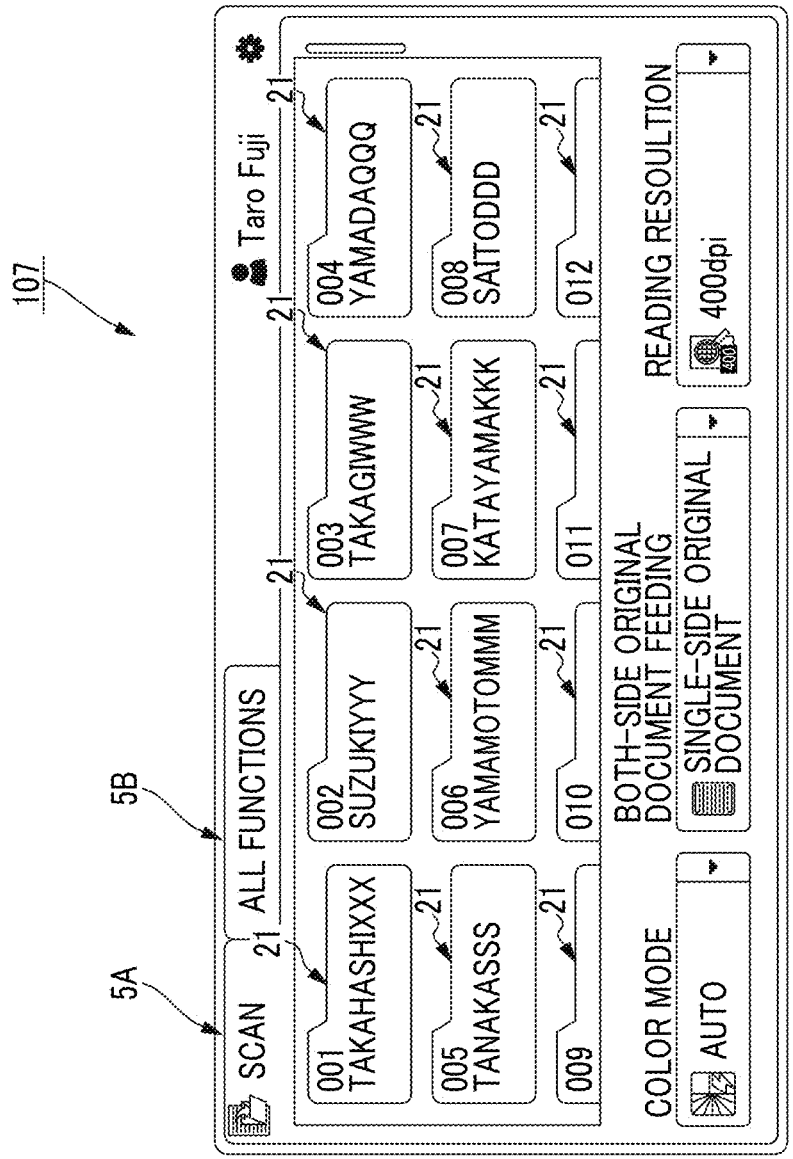

| SCAN | ALL FUNCTIONS |
5A  5B

ALL FUNCTIONS
☐ FILE NAME                    XXX
ORIGINAL DOCUMENT SETTING      REA
DIRECTION DESIGNATION
✷ DESTINY                      ☐
☐ PAGE TRANSFER                LEF
☐ SCREEN/FILE SIZE             
☐ FILE SENDING METHOD          AUT
☐ GROUND COLOR REMOVAL

107

(B)

● MAIL TO YOURSELF                    ● Taro Fuji
☐ FILE NAME                    ✖ CANCEL PLEASE PERFORM SELECTION FROM THE FOLLOWING
REGISTRATION CHARACTER SERIES OR PRESS
THE AREA TO PERFORM INPUT THROUGH KEYBOARD.

☐ FILE NAME           ⊙ DELETE ALL | DELETE ONE CHARACTER
AUTOMATIC SETTING

| JOURNAL | REFERENCE DOCUMENT | SCAN DOCUMENT | TARO FUJI |
| CONTRACT | ESTIMATE | REPORT | 2013_04_18_154451 |
| APPLICATION | IN-HOUSE DOCUMENT | SPECIFICATION | DATE FORMAT... |
| CATALOG | ORDER | VOUCHER | |

107

FIG. 9
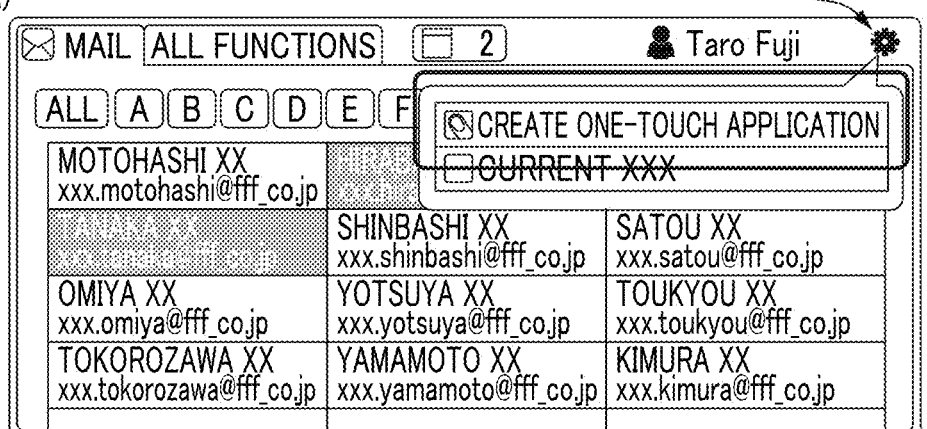
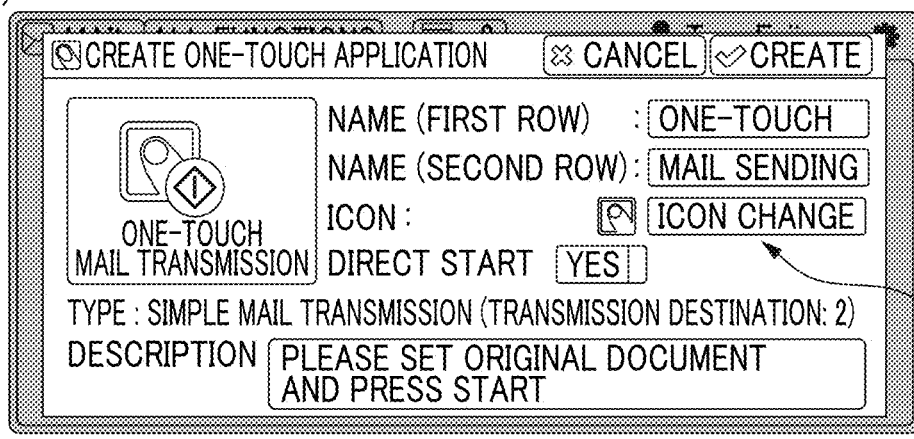
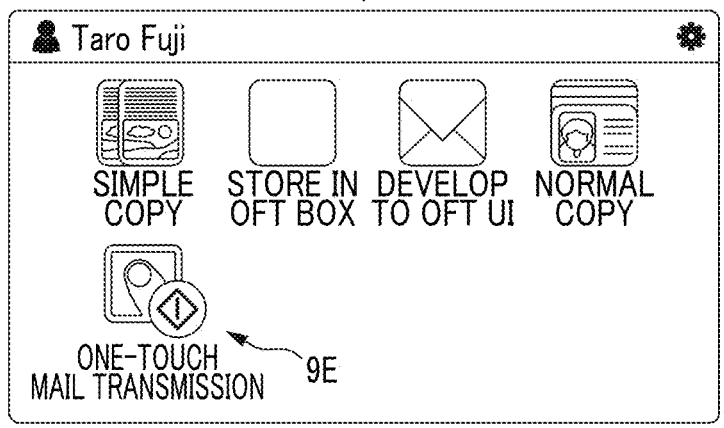

| ADDRESS | SETTING ITEM | EXAMPLE | PRIORITY |
|---|---|---|---|
| A1 | #1 | BOTH-SIDE/SINGLE-SIDE/BINDING | 5 |
| A2 | #2 | NUMBER OF COPIES | 1 |
| A3 | #3 | PLURAL PAGES ON ONE SHEET(N-UP) | 3 |
| A4 | #4 | MAGNIFICATION | 6 |
| A5 | #5 | COLOR MODE | 2 |
| A6 | #6 | SHEET SELECTION | 4 |
| A7 | | | |

(C)

| ADDRESS | SETTING ITEM | EXAMPLE | PRIORITY |
|---|---|---|---|
| B1 | #7 | ORIGINAL DOCUMENT SETTING DIRECTION DESIGNATION | 7 |
| B2 | #8 | DENSITY | 11 |
| B3 | #9 | ORIGINAL DOCUMENT TYPE | 8 |
| B4 | #10 | GROUND COLOR REMOVAL | 12 |
| B5 | #11 | MIXED SIZE ORIGINAL DOCUMENT FEEDING | 9 |
| B6 | #12 | STAMP | 13 |
| B7 | #13 | PAPER FASTENER | 10 |
| B8 | #2 | NUMBER OF COPIES | 1 |
| B9 | #5 | COLOR MODE | 2 |
| B10 | #3 | PLURAL PAGES ON ONE SHEET(N-UP) | 3 |
| B11 | #6 | SHEET SELECTION | 4 |
| B12 | #1 | BOTH-SIDE/SINGLE-SIDE/BINDING | 5 |
| B13 | #4 | MAGNIFICATION | 6 |

FIRST TAB 3A

| ADDRESS | SETTING ITEM | EXAMPLE | PRIORITY |
|---|---|---|---|
| A1 | #1 | BOTH-SIDE/ SINGLE-SIDE/BINDING | 5 |
| A2 | #2 | NUMBER OF COPIES | 1 |
| A3 | #3 | PLURAL PAGES ON ONE SHEET(N-UP) | 3 |
| A4 | #4 | MAGNIFICATION | 6 |
| A5 | #5 | COLOR MODE | 2 |
| A6 | #6 | SHEET SELECTION | 4 |
| A7 | #8 | DENSITY | 11 |

(C)

| ADDRESS | SETTING ITEM | EXAMPLE | PRIORITY |
|---|---|---|---|
| B1 | #7 | ORIGINAL DOCUMENT SETTING DIRECTION DESIGNATION | 7 |
| B2 | #9 | ORIGINAL DOCUMENT TYPE | 8 |
| B3 | #10 | GROUND COLOR REMOVAL | 12 |
| B4 | #11 | MIXED SIZE ORIGINAL DOCUMENT FEEDING | 9 |
| B5 | #12 | STAMP | 13 |
| B6 | #13 | PAPER FASTENER | 10 |
| B7 | #2 | NUMBER OF COPIES | 1 |
| B8 | #5 | COLOR MODE | 2 |
| B9 | #3 | PLURAL PAGES ON ONE SHEET(N-UP) | 3 |
| B10 | #6 | SHEET SELECTION | 4 |
| B11 | #1 | BOTH-SIDE/ SINGLE-SIDE/BINDING | 5 |
| B12 | #4 | MAGNIFICATION | 6 |
| B13 | #8 | DENSITY | 11 |

FIRST TAB 3A (B7–B13)

| ADDRESS | SETTING ITEM | EXAMPLE | PRIORITY |
|---|---|---|---|
| A1 | #1 | BOTH-SIDE/SINGLE-SIDE/BINDING | 5 |
| A2 | #2 | NUMBER OF COPIES | 1 |
| A3 | #3 | PLURAL PAGES ON ONE SHEET(N-UP) | 3 |
| A4 | #4 | MAGNIFICATION | 6 |
| A5 | #5 | COLOR MODE | 2 |
| A6 | #6 | SHEET SELECTION | 4 |
| A7 | #13 | PAPER FASTENER | 10 |

(C)

| ADDRESS | SETTING ITEM | EXAMPLE | PRIORITY |
|---|---|---|---|
| B1 | #7 | ORIGINAL DOCUMENT SETTING DIRECTION DESIGNATION | 7 |
| B2 | #8 | DENSITY | 11 |
| B3 | #9 | ORIGINAL DOCUMENT TYPE | 8 |
| B4 | #10 | GROUND COLOR REMOVAL | 12 |
| B5 | #11 | MIXED SIZE ORIGINAL DOCUMENT FEEDING | 9 |
| B6 | #12 | STAMP | 13 |
| B7 | #2 | NUMBER OF COPIES | 1 |
| B8 | #5 | COLOR MODE | 2 |
| B9 | #3 | PLURAL PAGES ON ONE SHEET(N-UP) | 3 |
| B10 | #6 | SHEET SELECTION | 4 |
| B11 | #1 | BOTH-SIDE/SINGLE-SIDE/BINDING | 5 |
| B12 | #4 | MAGNIFICATION | 6 |
| B13 | #13 | PAPER FASTENER | 10 |

FIRST TAB 3A

| ADDRESS | SETTING ITEM | EXAMPLE | PRIORITY |
|---|---|---|---|
| A1 | #1 | BOTH-SIDE/SINGLE-SIDE/BINDING | 5 |
| A2 | #2 | NUMBER OF COPIES | 1 |
| A3 | #3 | PLURAL PAGES ON ONE SHEET(N-UP) | 3 |
| A4 | #4 | MAGNIFICATION | 6 |
| A5 | #5 | COLOR MODE | 2 |
| A6 | #6 | SHEET SELECTION | 4 |
| A7 | | | |

(C)

| ADDRESS | SETTING ITEM | EXAMPLE | PRIORITY |
|---|---|---|---|
| B1 | #7 | ORIGINAL DOCUMENT SETTING DIRECTION DESIGNATION | 7 |
| B2 | #8 | DENSITY | 11 |
| B3 | #9 | ORIGINAL DOCUMENT TYPE | 8 |
| B4 | #10 | GROUND COLOR REMOVAL | 12 |
| B5 | #11 | MIXED SIZE ORIGINAL DOCUMENT FEEDING | 9 |
| B6 | #12 | STAMP | 13 |
| B7 | #13 | PAPER FASTENER | 10 |

| ADDRESS | SETTING ITEM | EXAMPLE | PRIORITY |
|---|---|---|---|
| A1 | #1 | BOTH-SIDE/ SINGLE-SIDE/BINDING | 5 |
| A2 | #2 | NUMBER OF COPIES | 1 |
| A3 | #3 | PLURAL PAGES ON ONE SHEET (N-UP) | 3 |
| A4 | #4 | MAGNIFICATION | 6 |
| A5 | #5 | COLOR MODE | 2 |
| A6 | #6 | SHEET SELECTION | 4 |
| A7 | #8 | DENSITY | 11 |

(C)

| ADDRESS | SETTING ITEM | EXAMPLE | PRIORITY |
|---|---|---|---|
| B1 | #7 | ORIGINAL DOCUMENT SETTING DIRECTION DESIGNATION | 7 |
| B2 | #9 | ORIGINAL DOCUMENT TYPE | 8 |
| B3 | #10 | GROUND COLOR REMOVAL | 12 |
| B4 | #11 | MIXED SIZE ORIGINAL DOCUMENT FEEDING | 9 |
| B5 | #12 | STAMP | 13 |
| B6 | #13 | PAPER FASTENER | 10 |

| ADDRESS | SETTING ITEM | EXAMPLE | PRIORITY |
|---|---|---|---|
| A1 | #1 | BOTH-SIDE/SINGLE-SIDE/BINDING | 5 |
| A2 | #2 | NUMBER OF COPIES | 1 |
| A3 | #3 | PLURAL PAGES ON ONE SHEET (N-UP) | 3 |
| A4 | #4 | MAGNIFICATION | 6 |
| A5 | #5 | COLOR MODE | 2 |
| A6 | #6 | SHEET SELECTION | 4 |
| A7 | #13 | PAPER FASTENER | 10 |

(C)

| ADDRESS | SETTING ITEM | EXAMPLE | PRIORITY |
|---|---|---|---|
| B1 | #7 | ORIGINAL DOCUMENT SETTING DIRECTION DESIGNATION | 7 |
| B2 | #8 | DENSITY | 11 |
| B3 | #9 | ORIGINAL DOCUMENT TYPE | 8 |
| B4 | #10 | GROUND COLOR REMOVAL | 12 |
| B5 | #11 | MIXED SIZE ORIGINAL DOCUMENT FEEDING | 9 |
| B6 | #12 | STAMP | 13 |

| ADDRESS | SETTING ITEM | EXAMPLE | PRIORITY |
|---|---|---|---|
| A1 | #1 | BOTH-SIDE/SINGLE-SIDE/BINDING | 5 |
| A2 | #2 | NUMBER OF COPIES | 1 |
| A3 | #3 | PLURAL PAGES ON ONE SHEET(N-UP) | 3 |
| A4 | #4 | MAGNIFICATION | 6 |
| A5 | #5 | COLOR MODE | 2 |
| A6 | #6 | SHEET SELECTION | 4 |
| A7 | #8 | DENSITY | 11 |

(C)

| ADDRESS | SETTING ITEM | EXAMPLE | PRIORITY |
|---|---|---|---|
| B1 | #7 | ORIGINAL DOCUMENT SETTING DIRECTION DESIGNATION | 7 |
| B2 | #13 | PAPER FASTENER | 11 |
| B3 | #9 | ORIGINAL DOCUMENT TYPE | 8 |
| B4 | #10 | GROUND COLOR REMOVAL | 12 |
| B5 | #11 | MIXED SIZE ORIGINAL DOCUMENT FEEDING | 9 |
| B6 | #12 | STAMP | 13 |

IMAGE FORMING APPARATUS, PROCESSING DEVICE, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2013-167137 filed Aug. 9, 2013.

BACKGROUND

Technical Field

The present invention relates to an image forming apparatus, a processing device, and a non-transitory computer-readable medium.

SUMMARY

According to an aspect of the invention, there is provided an image forming apparatus including:

a processing unit that performs a predetermined process for forming an image;

a display unit that displays a first screen for displaying Q (where Q is an integer equal to or greater than one and less than P) setting items out of P (where P is an integer equal to or greater than two) setting items for setting conditions in which the processing unit performs the process to set the Q setting items or a second screen for displaying R (where R is an integer equal to or greater than one, equal to or less than P, and greater than Q) setting items out of the P setting items to set the R setting items; and a switching unit that switches a display screen to be displayed on the display unit between the first screen and the second screen based on a user's instruction, wherein all of the P setting items are capable to be set using the Q setting items displayed on the first screen and the R setting items displayed on the second screen.

BRIEF DESCRIPTION OF THE DRAWINGS

Exemplary embodiments of the present invention will be described in detail based on the following figures, wherein:

FIG. 4 is a diagram illustrating a display example in the display unit;

FIG. 5 is a diagram illustrating a display screen when "box storage" on a home screen shown in FIG. 2 is selected;

Figure 7:
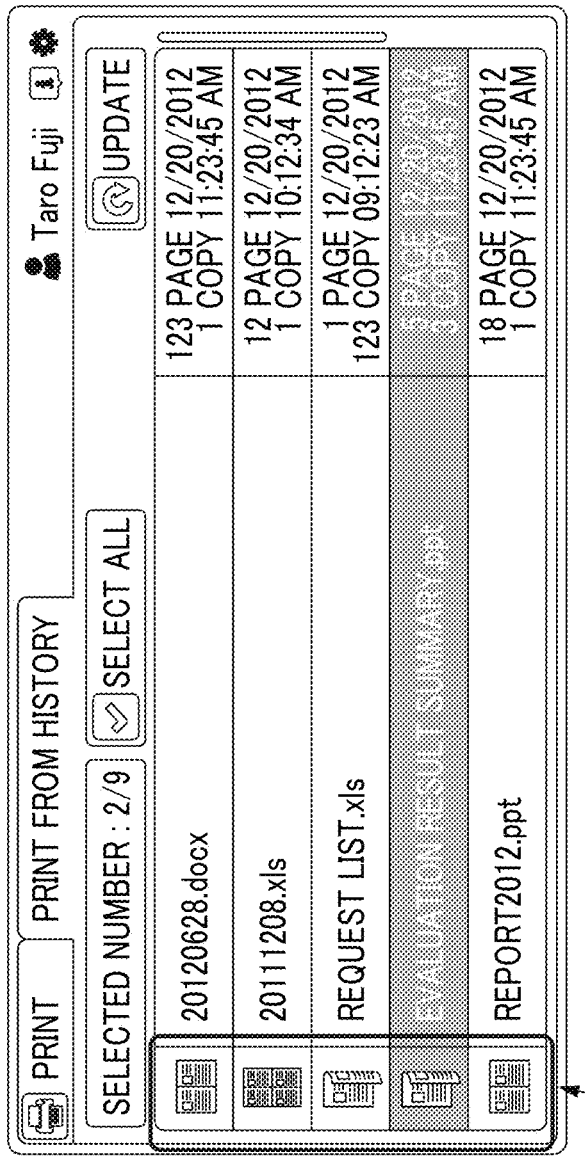
Figure 8:
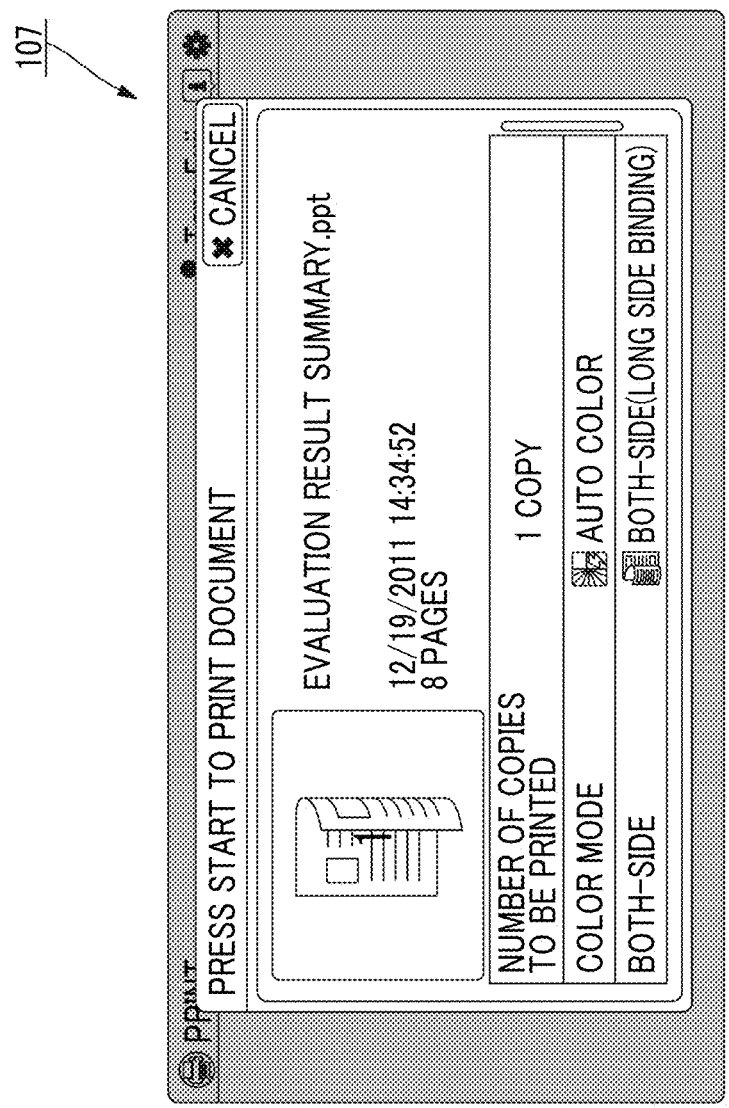
Figure 10:
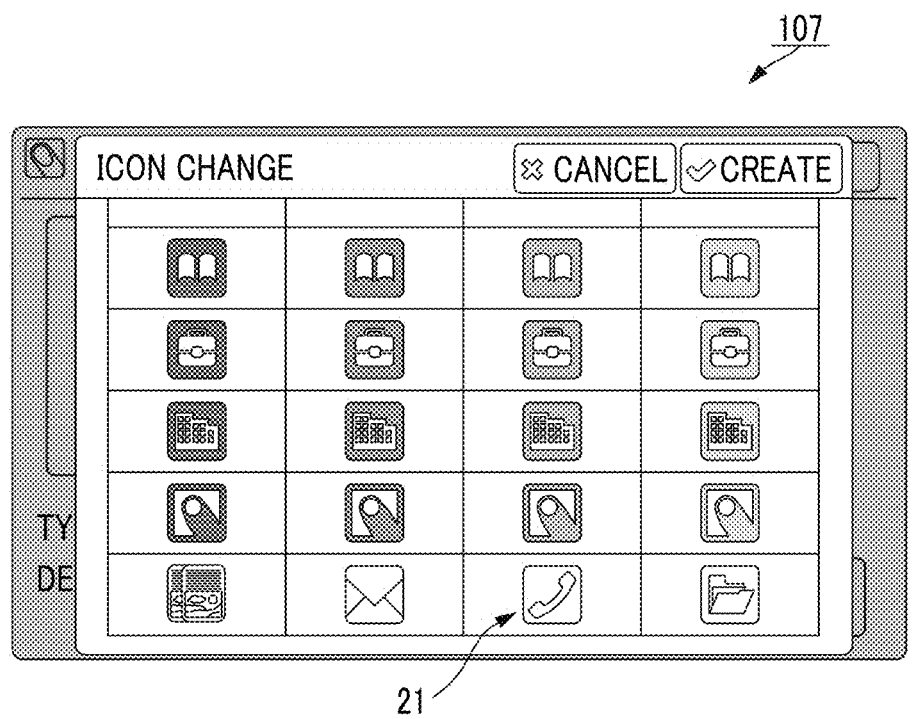
Figure 11:
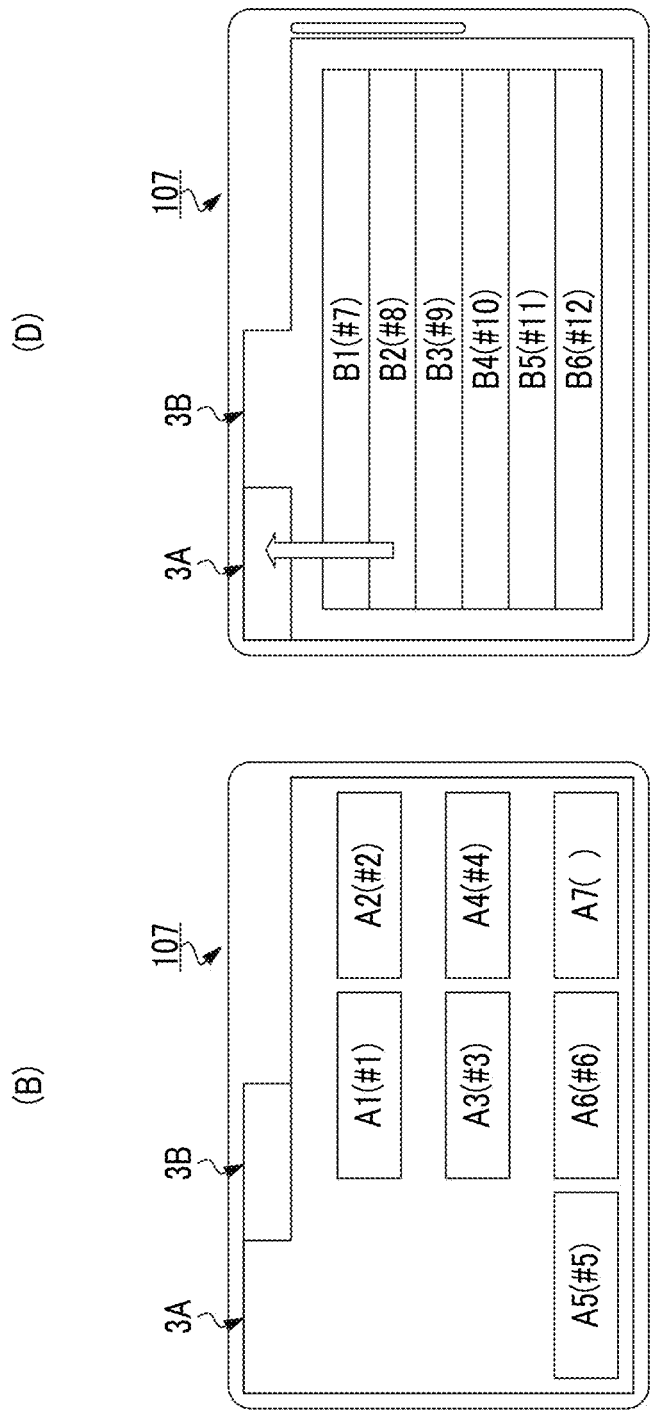
Figure 12:
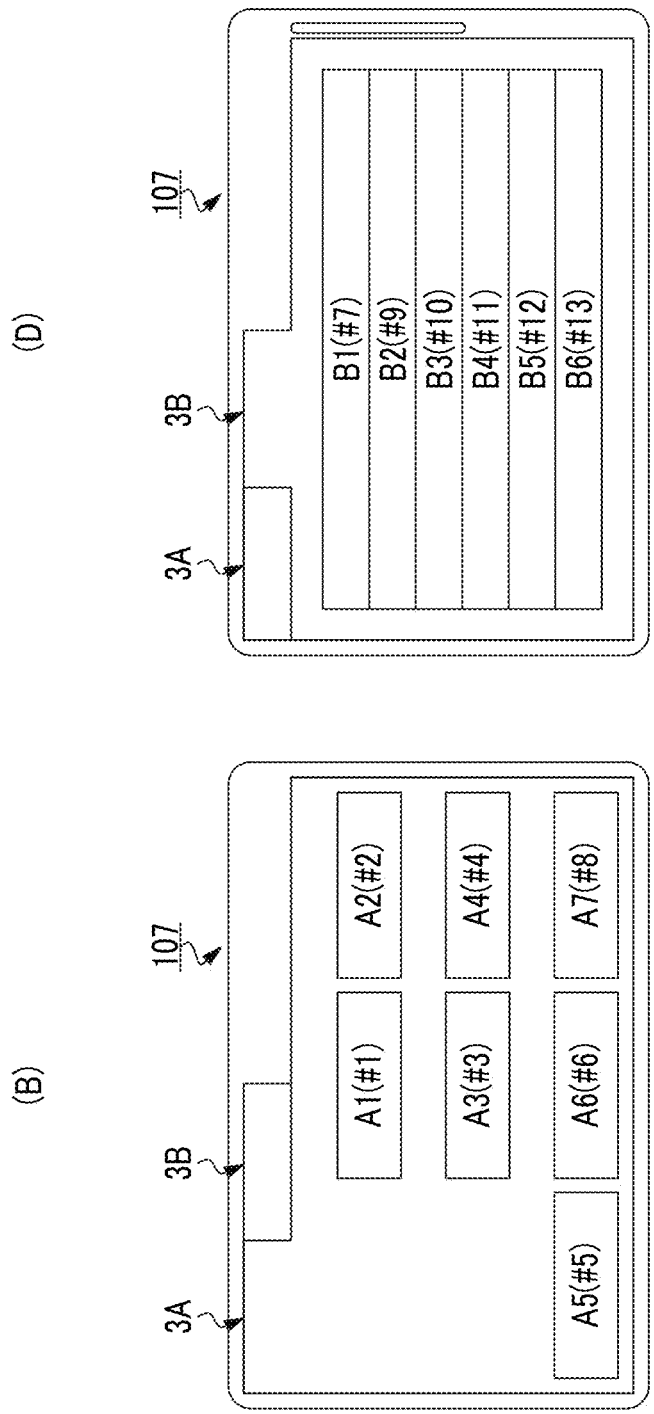
Figure 13:
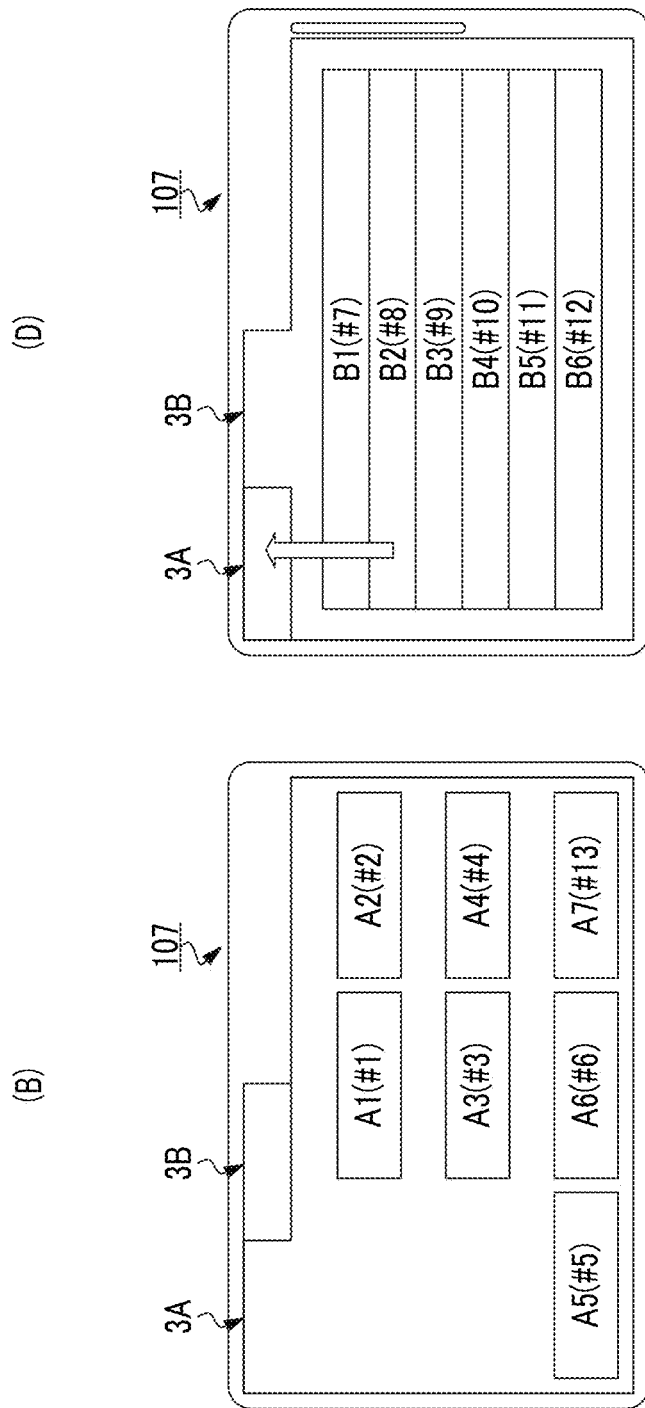
Figure 14:
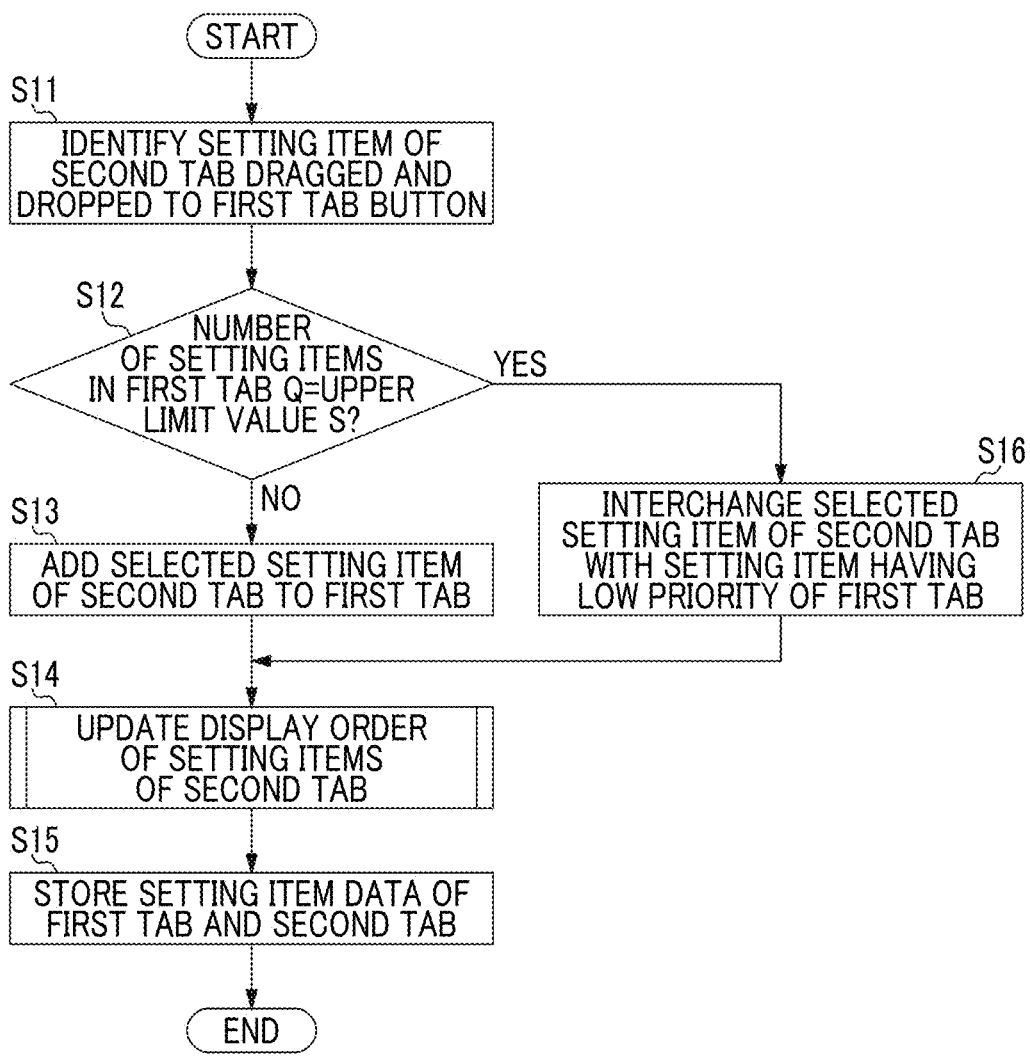
Figure 15:
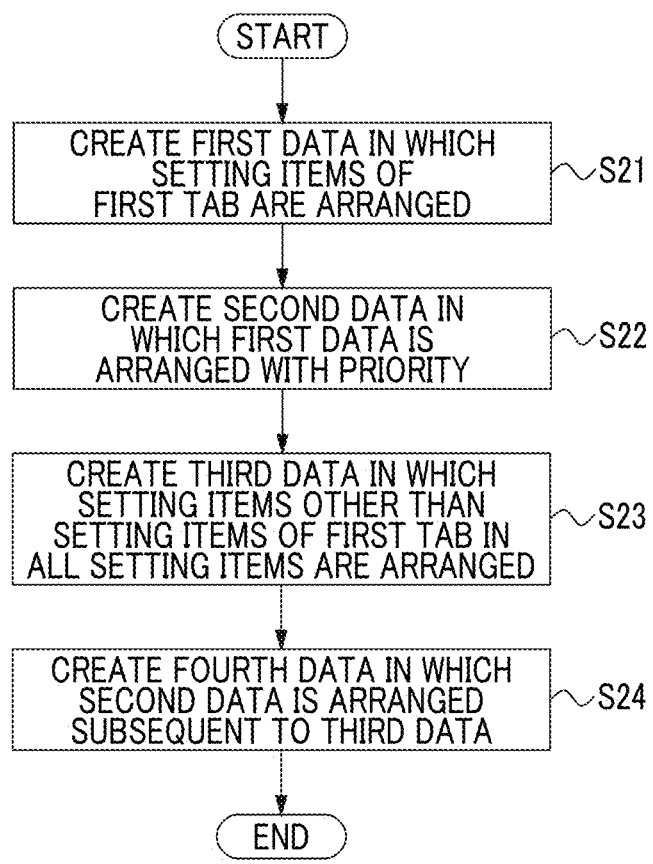
Figure 16:
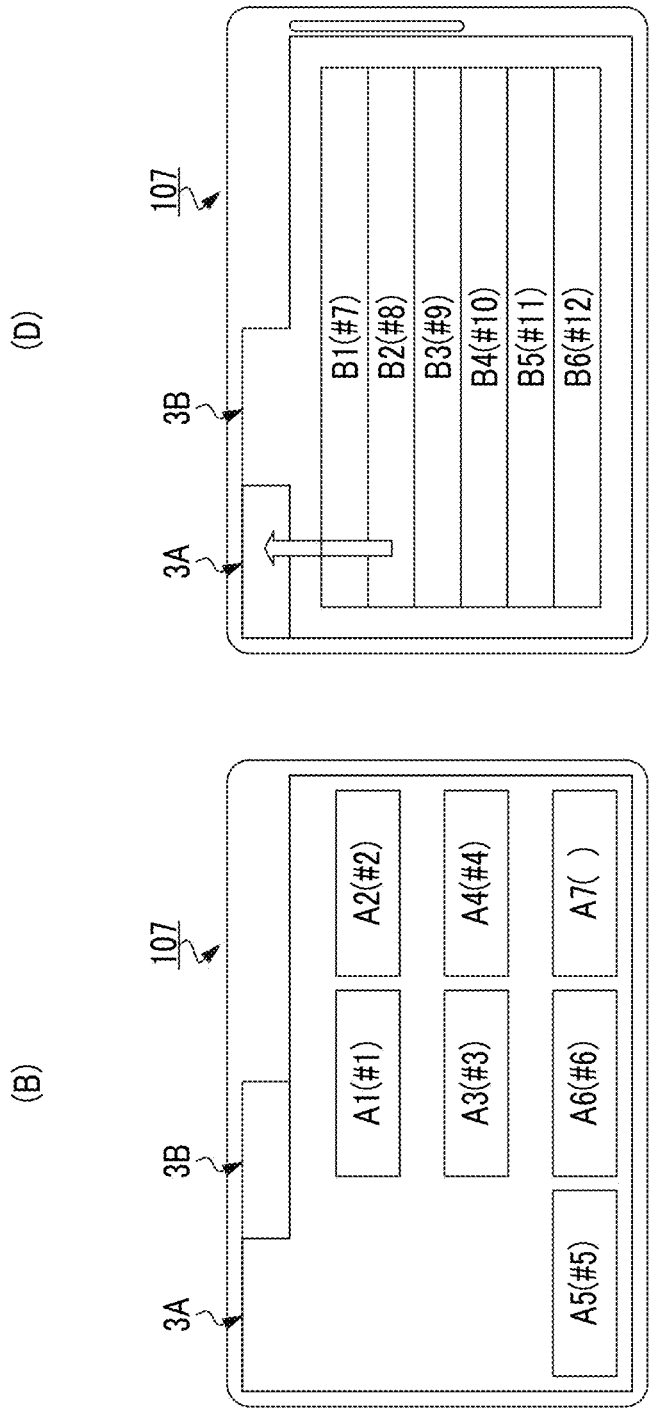
Figure 17:
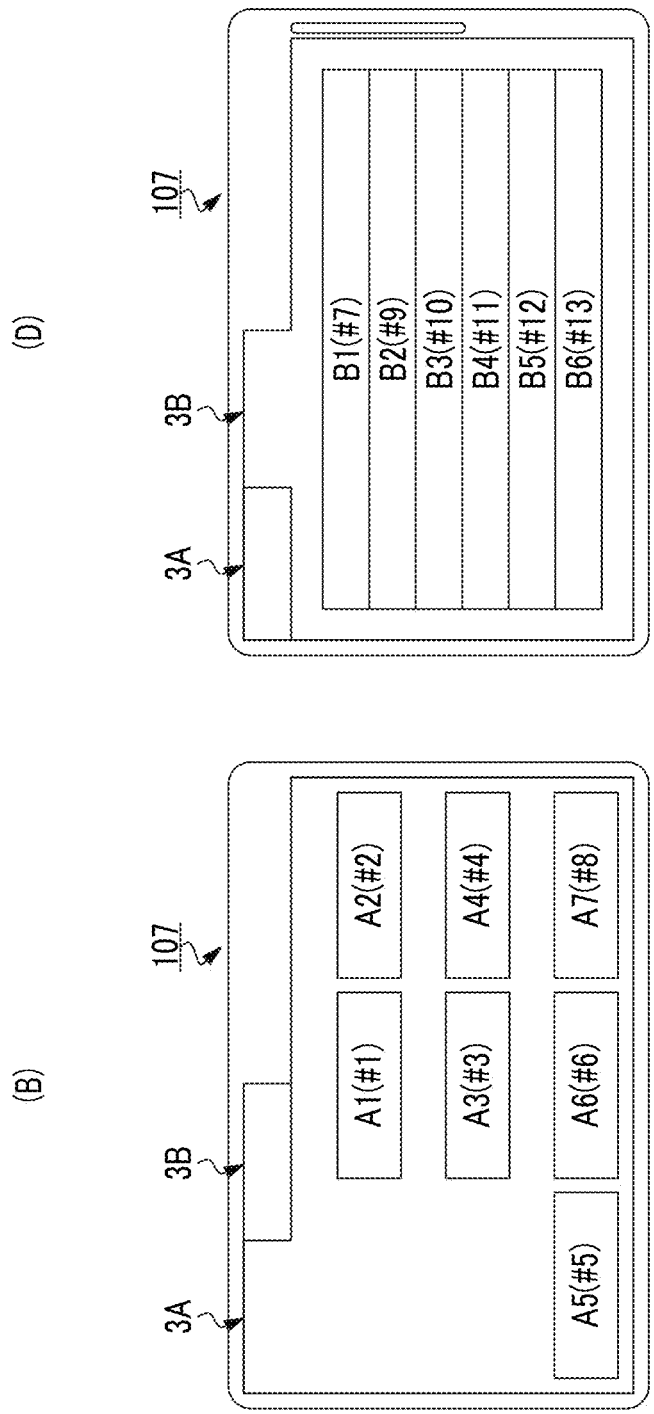
Figure 18:
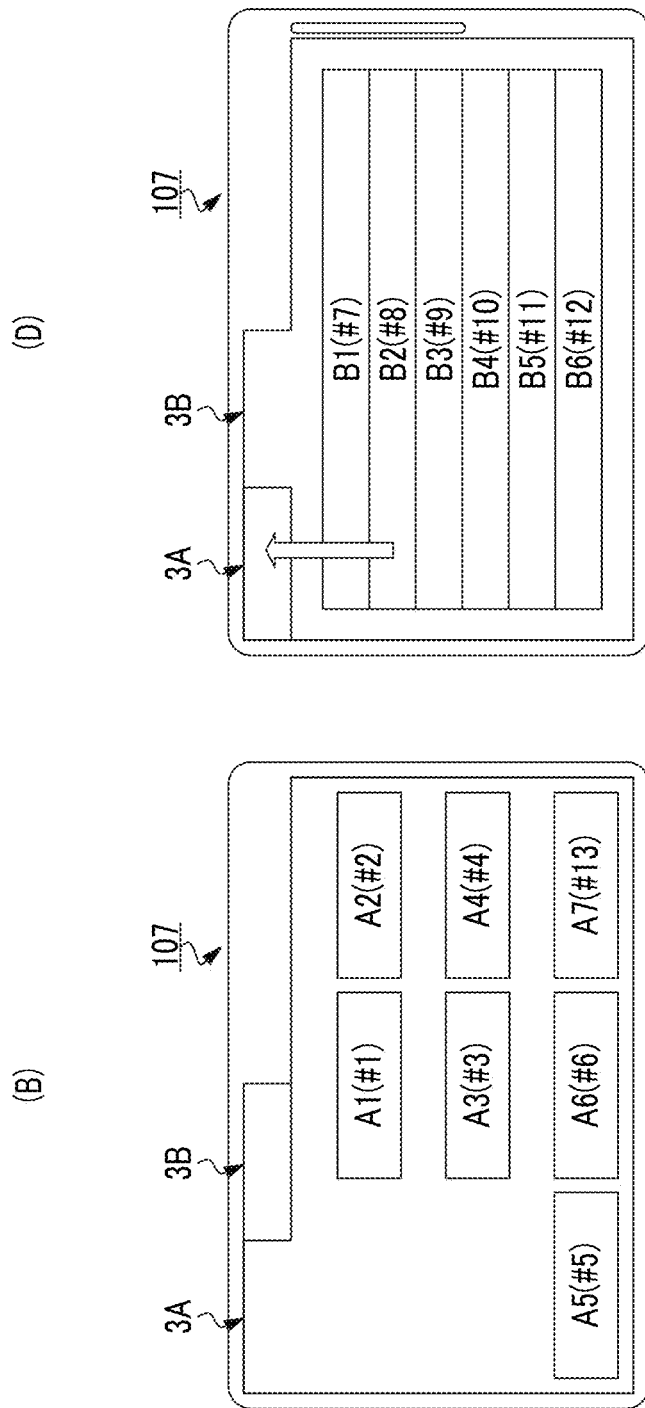
Figure 19:
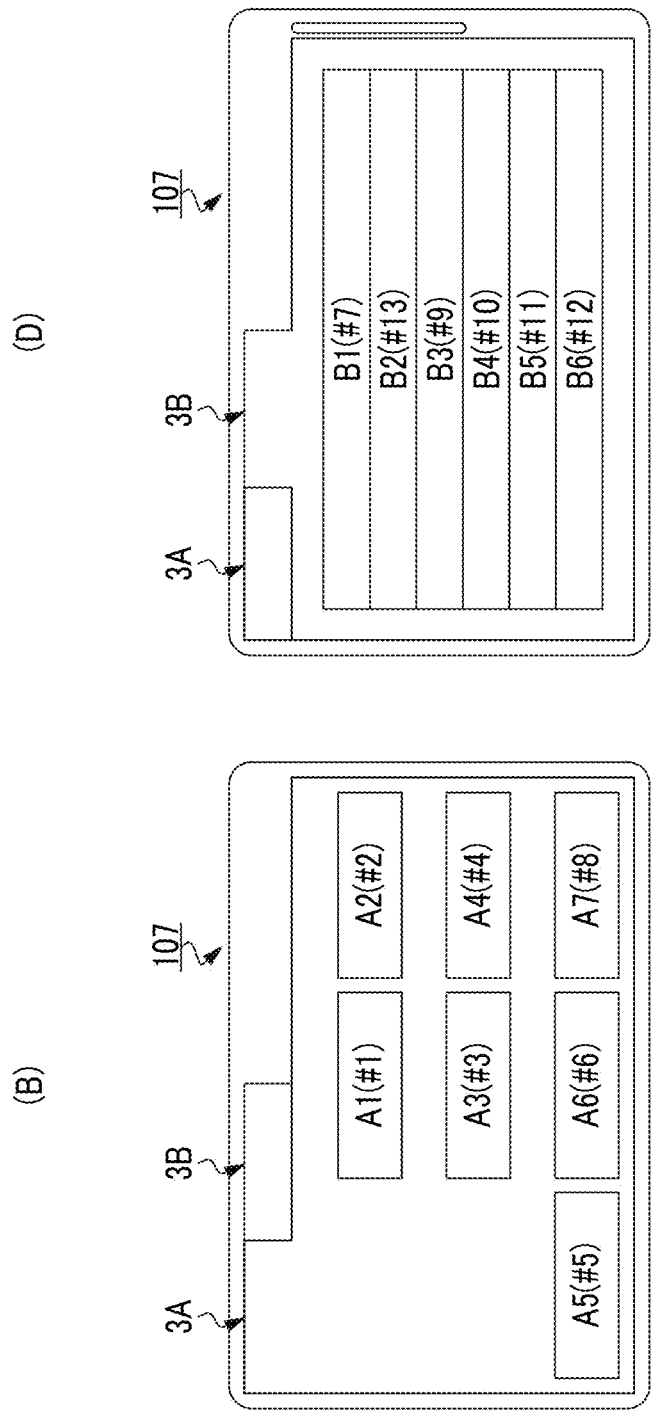
Figure 20:
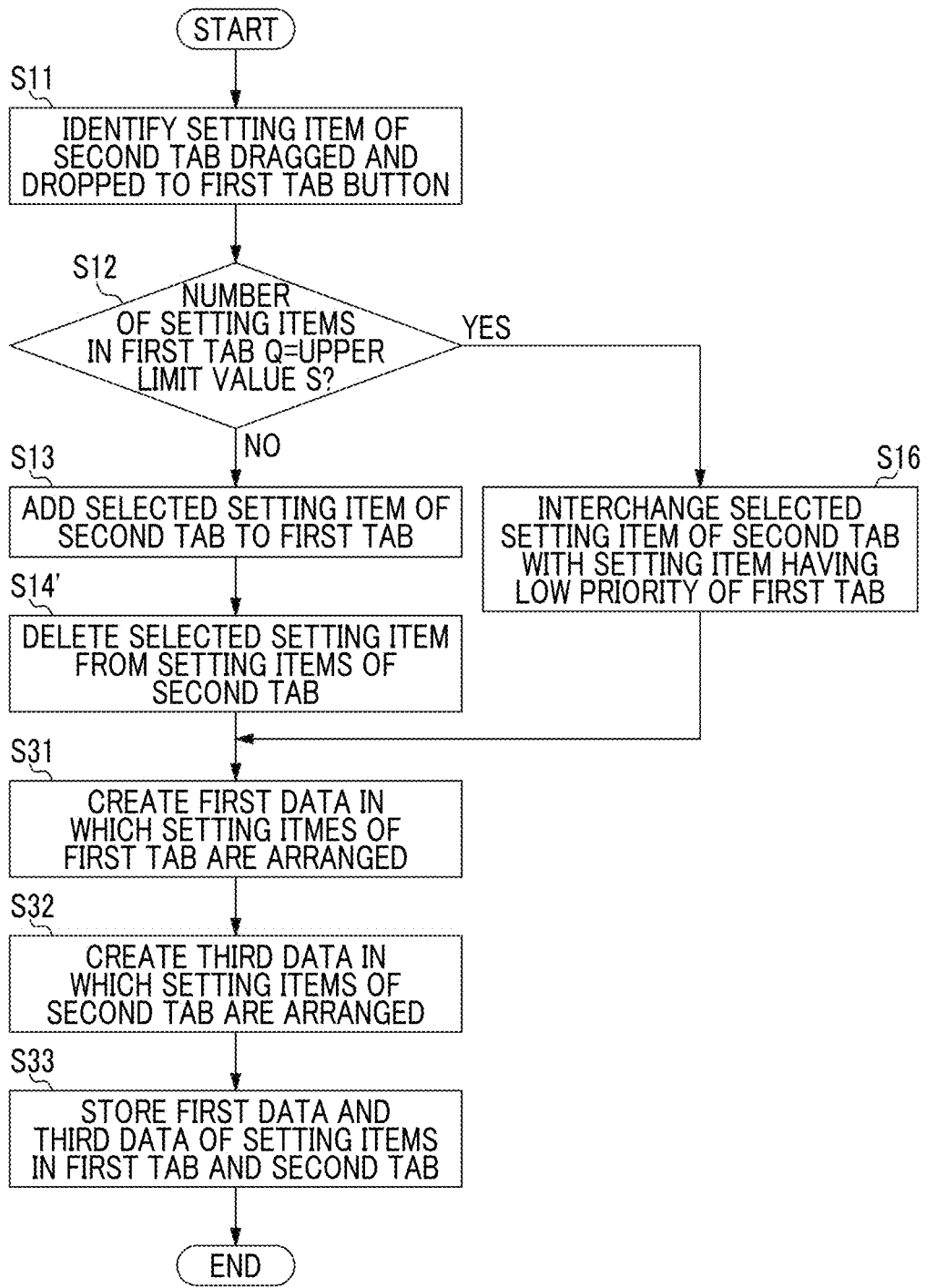

(A) and (B) of FIG. 6 are diagrams illustrating display screens when a second tab is selected;

FIG. 7 is a diagram illustrating a display screen after "personal printing" is selected;

FIG. 8 is a diagram illustrating a display screen after a file is selected;

(A) to (C) of FIG. 9 are diagrams illustrating display screens when a user creates one-touch selection buttons;

FIG. 10 is a diagram illustrating a list of the one-touch selection buttons;

(A) to (D) of FIG. 11 are diagrams illustrating an example of a relationship between setting items in a first tab and setting items in a second tab which are stored in a predetermined setting item storage area of a storage unit and setting items in the first tab and setting items in the second tab which are displayed on a display unit, where (A) of FIG. 11 illustrates the setting items in the first tab stored in the setting item storage area of the storage unit, (B) of FIG. 11 illustrates the setting items in the first tab displayed on the display unit, (C) of FIG. 11 illustrates the setting items in the second tab stored in the setting item storage area, and (D) of FIG. 11 illustrates the setting items in the second tab displayed on the display unit;

(A) to (D) of FIG. 12 are diagrams illustrating an example of a relationship between setting items in the first tab and setting items in the second tab which are stored in the setting item storage area of the storage unit and setting items in the first tab and setting items in the second tab which are displayed on a display unit after a change, where (A) of FIG. 12 illustrates the setting items in the first tab stored in the setting item storage area of the storage unit, (B) of FIG. 12 illustrates the setting items in the first tab displayed on the display unit, (C) of FIG. 12 illustrates the setting items in the second tab stored in the setting item storage area, and (D) of FIG. 12 illustrates the setting items in the second tab displayed on the display unit;

(A) to (D) of FIG. 13 are diagrams illustrating another example of a relationship between setting items in the first tab and setting items in the second tab which are stored in the setting item storage area of the storage unit and setting items in the first tab and setting items in the second tab which are displayed on a display unit, where (A) of FIG. 13 illustrates the setting items in the first tab stored in the setting item storage area of the storage unit, (B) of FIG. 13 illustrates the setting items in the first tab displayed on the display unit, (C) of FIG. 13 illustrates the setting items in the second tab stored in the setting item storage area, and (D) of FIG. 13 illustrates the setting items in the second tab displayed on the display unit;

FIG. 14 is a flowchart illustrating a method of changing setting items displayed on display screens of the first tab and the second tab;

FIG. 15 is a flowchart illustrating a method of changing a display order of setting items on the display screen of the second tab;

(A) to (D) of FIG. 16 are diagrams illustrating still another example of a relationship between setting items in the first tab and setting items in the second tab which are stored in the setting item storage area of the storage unit and setting items in the first tab and setting items in the second tab which are displayed on a display unit, where (A) of FIG. 16 illustrates the setting items in the first tab stored in the setting item storage area of the storage unit, (B) of FIG. 16 illustrates the setting items in the first tab displayed on the display unit, (C) of FIG. 16 illustrates the setting items in the second tab stored in the setting item storage area, and (D) of FIG. 16 illustrates the setting items in the second tab displayed on the display unit;

(A) to (D) of FIG. 17 are diagrams illustrating another example of a relationship between setting items in the first tab and setting items in the second tab which are stored in the setting item storage area of the storage unit and setting items in the first tab and setting items in the second tab which are displayed on a display unit after a change, where (A) of FIG. 17 illustrates the setting items in the first tab stored in the setting item storage area of the storage unit, (B) of FIG. 17 illustrates the setting items in the first tab displayed on the display unit, (C) of FIG. 17 illustrates the setting items in the second tab stored in the setting item storage area, and (D) of FIG. 17 illustrates the setting items in the second tab displayed on the display unit;

(A) to (D) of FIG. 18 are diagrams illustrating still another example of a relationship between setting items in the first tab and setting items in the second tab which are stored in the setting item storage area of the storage unit and setting items in the first tab and setting items in the second tab which are displayed on a display unit, where (A) of FIG. 18 illustrates the setting items in the first tab stored in the setting item storage area of the storage unit, (B) of FIG. 18 illustrates the setting items in the first tab displayed on the display unit, (C) of FIG. 18 illustrates the setting items in the second tab stored in the setting item storage area, and (D) of FIG. 18 illustrates the setting items in the second tab displayed on the display unit;

(A) to (D) of FIG. 19 are diagrams illustrating still another example of a relationship between setting items in the first tab and setting items in the second tab which are stored in the setting item storage area of the storage unit and setting items in the first tab and setting items in the second tab which are displayed on a display unit after a change, where (A) of FIG. 19 illustrates the setting items in the first tab stored in the setting item storage area of the storage unit, (B) of FIG. 19 illustrates the setting items in the first tab displayed on the display unit, (C) of FIG. 19 illustrates the setting items in the second tab stored in the setting item storage area, and (D) of FIG. 19 illustrates the setting items in the second tab displayed on the display unit; and FIG. 20 is a flowchart illustrating another method of changing the setting items in the first tab and the second tab.

DETAILED DESCRIPTION

Hereinafter, exemplary embodiments of the invention will be described with reference to the accompanying drawings.

Figure 1:
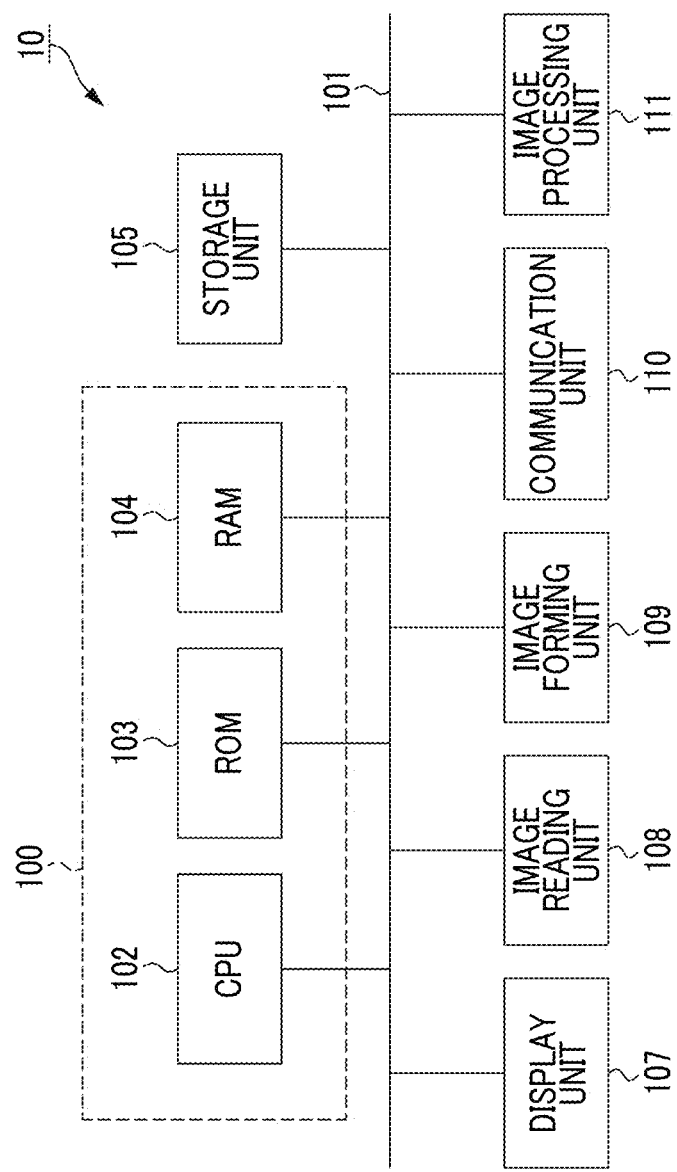
FIG. 1 is a block diagram illustrating a hardware configuration of an image forming apparatus according to an exemplary embodiment of the invention.

FIG. 1 is a block diagram illustrating a hardware configuration of an image forming apparatus 10 according to an exemplary embodiment of the invention. The image forming apparatus 10 of the exemplary embodiment includes a control unit 100, a storage unit 105, a display unit 107, an image reading unit 108, an image forming unit 109, a communication unit 110, and an image processing unit 111. The respective functional units are connected to a bus 101 to perform data exchange through the bus 101.

The control unit 100 controls the respective functional units provided in the image forming apparatus 10. Here, the control unit 100 includes a central processing unit (CPU) 102, a read only memory (ROM) 103, and a random access memory (RAM) 104.

The ROM 103 stores a control program executed by the CPU 102. The CPU 102 reads the control program stored in the ROM 103, and executes the control program using the RAM 104 as an operating area. If the control program is executed by the CPU 102, the respective functional units of the image forming apparatus 10 are controlled. Thus, for example, a predetermined display is performed in the display unit 107, and image formation onto a sheet is performed. Further, reading of an original document set in the image reading unit 108, or the like is performed.

The program executed by the CPU 102 may be provided in a state where the program is stored in a computer readable recording medium such as a magnetic recording medium (magnetic tape, magnetic disk or the like), an optical recording medium (optical disc or the like), a magneto-optical recording medium or a semiconductor memory. Further, the program may be downloaded to the image forming apparatus 10 using a communication unit such as the internet.

The display unit 107 is formed by a liquid crystal touch panel display, for example, and displays data relating to the image forming apparatus 10, for example, under the control of the control unit 100. Further, the display unit 107 displays a display screen for receiving an operation from a user, and receives the operation from the user through the display screen.

The image reading unit 108 includes an image reader (scanner) that reads a document to generate image data indicating an image of the document, and outputs the generated image data to the image processing unit 111.

The image forming unit 109 has an image forming mechanism that forms a toner image based on the image data, for example, on a sheet that is a recording medium by an electrophotographic technique or the like.

The communication unit 110 is connected to a communication line (not shown), and functions as a communication interface that performs communication with a different device connected to the communication line.

The image processing unit 111 performs image processing such as color correction, gradation correction and the like for the input image data, and generates image data subjected to the image processing to output the image data to the image forming unit 109.

The storage unit 105 includes a memory such as a hard disk drive, and for example, stores data received through the communication unit 110 or data generated in the image forming apparatus 10.

Figure 2:
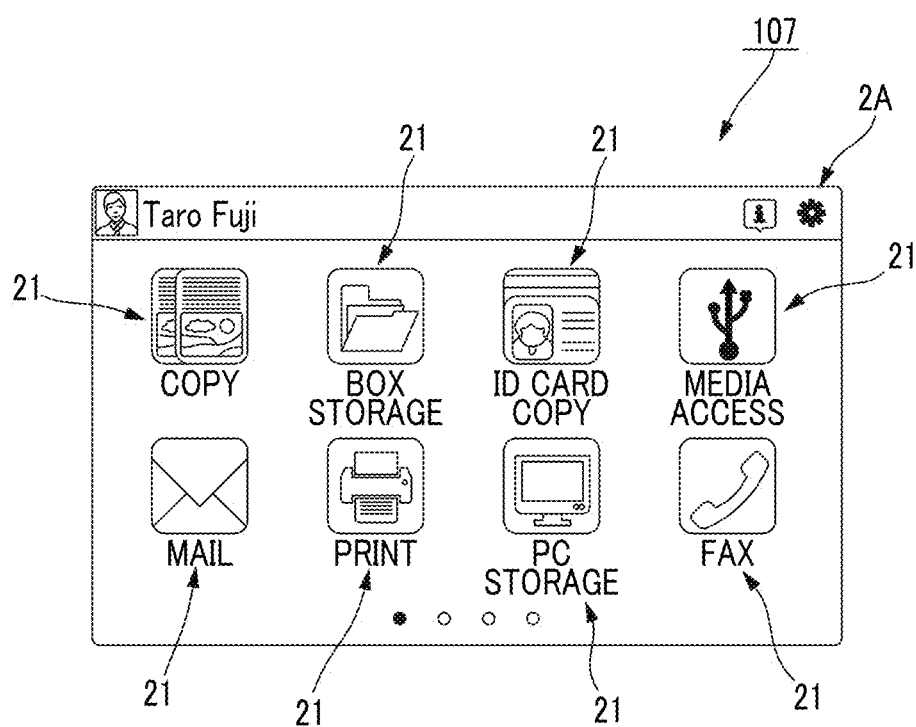
FIG. 2 is a diagram illustrating a display example in a display unit.

FIG. 2 is a diagram illustrating a display example in the display unit 107.

A home screen shown in FIG. 2 is normally displayed in the display unit 107. On the home screen, plural selection buttons (icons) 21 are displayed. As any one button of the selection buttons 21 is selected (pressed) by a user, a function corresponding to the selected selection button 21 is executed.

Specifically, in the example shown in FIG. 2, as the selection buttons 21, selection buttons 21 for selecting any one of "copy", "box storage", "ID card copy", "media access", "mail", "print", "PC storage" and "fax" are displayed. Further, in the exemplary embodiment, if the user selects any one of these selection buttons 21, a screen for performing detailed setting is then displayed. Then, if a predetermined button such as a start button is pressed by the user, a process such as copy is started.

The home screen of the exemplary embodiment is configured by plural pages, and is switched to another page by drawing a "ground" portion (background portion) on the display screen shown in FIG. 2 in a left direction in the figure while pressing the "ground" portion with a finger. Additionally, in the exemplary embodiment, the page switching is performed by a so-called flick operation. If the page switching is performed, different selection buttons 21 appear.

Further, in the display unit 107 of the exemplary embodiment, each of the selection buttons 21 is movable according to an operation. Specifically, by moving a finger in a state where the selection button 21 is pressed by the finger, it is possible to move the selection button 21. In other words, in the exemplary embodiment, the movement of the selection button 21 is performed by drag-and-drop.

Further, in the exemplary embodiment, if the selection button 21 is continuously pressed for a predetermined time, or if a gear-shaped symbol (symbol indicated by reference numeral 2A) positioned in an upper right part of the screen is pressed in a state where any one of the selection buttons 21 is selected, the screen is switched, so that detailed setting of functions associated with the selected selection button 21 may be performed.

Figure 3:
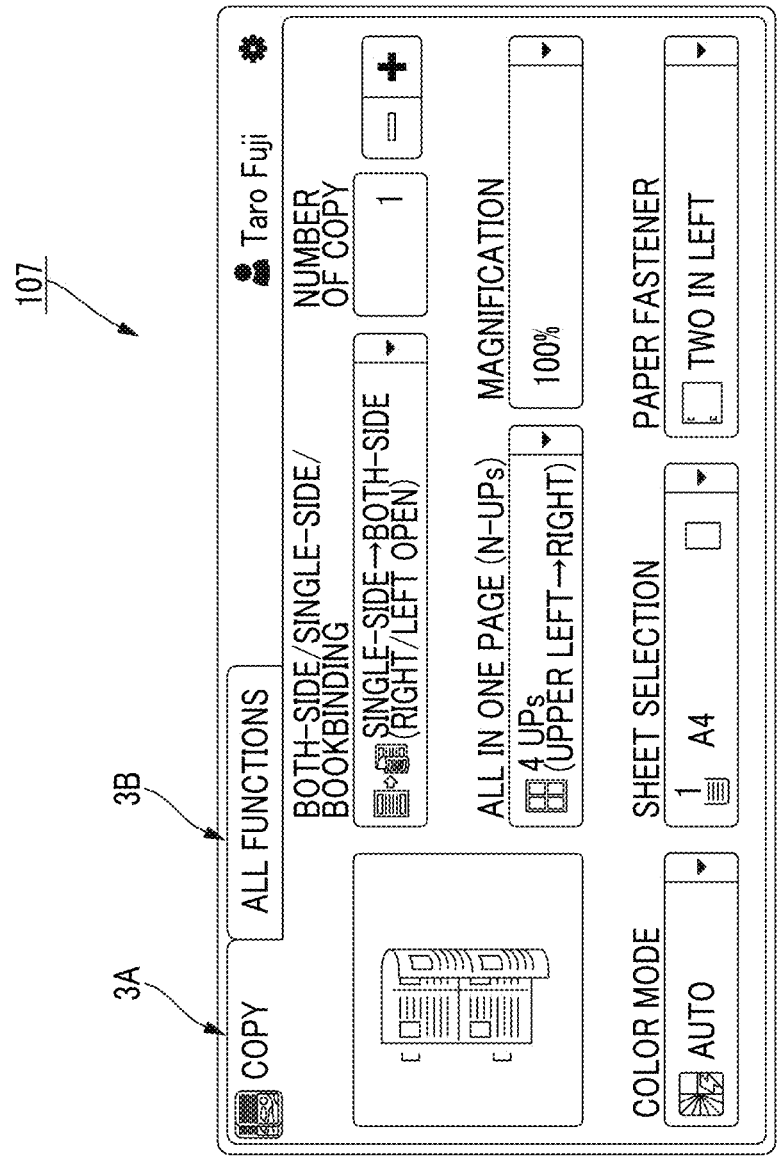
FIG. 3 is a diagram illustrating a display screen after a "copy" selection button shown in FIG. 2 is selected by a user.

FIG. 3 is a diagram illustrating a display screen after the "copy" selection button 21 shown in FIG. 2 is selected (pressed) by a user.

On this display screen, two tabs (hereinafter, referred to as a "first tab 3A" and a "second tab 3B") are provided as indicated by reference numerals 3A and 3B. If only two tabs are present in this way, a button (button to be operated) necessary for a user is present in any one tab. Then, if the tab is moved once, the necessarily necessary buttons are present, and thus, it is possible to reduce the number of times of the movement of the tab until the user selects a tab in which a necessary button (button to be operated) is present, compared with a case where there are three or more tabs, for example, four, five or the like.

In other words, if there are many tabs, it is difficult to recognize a matching relationship between the tabs and their functions. However, as in the exemplary embodiment, if only two tabs are present, it is easy to recognize the matching relationship between the tabs and their functions.

Here, in a state where the first tab 3A is selected, as shown in FIG. 3, setting items such as "both-side/single-side/bookbinding", "the number of copies", "the number of N-ups (the number of pages integrated in one page)", "magnification", "color mode", "sheet selection" and "paper fastener" are displayed. In other words, in the exemplary embodiment, on the display screen when the first tab 3A is selected, setting items considered to have a relatively high frequency of change by the user are displayed.

On the other hand, in the exemplary embodiment, with respect to setting items considered to have a relatively low frequency of change by the user, as shown in FIG. 4 (illustrating a display example in the display unit 107), the display is performed by a display screen when the second tab 3B is selected.

Here, on the display screen shown in FIG. 4, the respective setting items (respective items that are to be set by the user) are arranged in a longitudinal direction of the screen to be displayed. In other words, the setting items are displayed in a list form. On the display screen shown in FIG. 4, hidden setting items are also displayed by performing scroll downward in the figure.

Here, on the display screen when the second tab 3B is selected, other setting items are also displayed by performing scroll in one direction (downward in the figure). Thus, the user may easily find a setting item that the user is looking for.

Here, for example, it may be considered that the respective setting items are displayed in a button form and are arranged in a lattice form. In this case, the user should move the user's sight line in a longitudinal direction and in a transverse direction as necessary. In this case, it is difficult for the user to find the setting item that the user is looking for, compared with the case where the setting items are displayed by performing scroll in one direction as in the exemplary embodiment.

FIG. 5 is a diagram illustrating a display screen when the "box storage" on the home screen shown in FIG. 2 is selected.

If the "box storage" on the home screen is selected, as shown in FIG. 5, the screen is switched to a display screen in which plural selection buttons 21 that are given user names are displayed. On this display screen, similarly to the previous display screen, two tabs (hereinafter, referred to as a "first tab 5A" and a "second tab 5B") are provided.

FIG. 5 shows a state where the first tab 5A is selected. Further, in the exemplary embodiment, if the "box storage" is selected and the display screen is switched, first, the first tab 5A is displayed. Further, in the exemplary embodiment, as the user separately selects the second tab 5B, a display screen corresponding to the second tab 5B is displayed.

Here, the box storage refers to a process of storing the image data generated by reading the original document using the image reading unit 108 (see FIG. 1) in the storage unit 105. Here, if any one of the selection buttons 21 shown in FIG. 5 is selected by the user, a storage destination is designated, and the image data is stored in the storage destination.

Until the storage destination is selected, all the respective selection buttons 21 shown in FIG. 5 enter an off state (of approximately the same color as the color of "ground"), and if the storage destination is selected, the buttons are switched to a different color to enter an on state (selected state).

Further, on the display screen shown in FIG. 5, setting items ("color mode", "original document feeding mode" and "reading resolution") having a high change frequency from the user are displayed at the lowermost part of the screen. With respect to the setting items, the content thereof may be changed without performing screen switching (without selecting the second tab 5B).

(A) and (B) of FIG. 6 are diagrams illustrating display screens when the second tab 5B is selected.

As shown in (A) of FIG. 6, when the second tab 5B is selected, other setting items capable of being set in the box storage are displayed. In this case, the respective setting items may be displayed in a list form, similarly to the above description. Here, in the exemplary embodiment, a file name is given to each original document that is read by the image reading unit 108. Further, in the exemplary embodiment, if the setting item of "filename" shown in (A) of FIG. 6 is selected, a file name input display screen is displayed as shown in (B) of FIG. 6. In the exemplary embodiment, the user inputs a desired file name through the display screen.

Next, personal printing will be described.

In the personal printing, image data generated by a personal computer (PC) or the like of a user is transmitted to the image forming apparatus 10, and is temporarily stored in the storage unit 105 (see FIG. 1) of the image forming apparatus 10. Further, as the user inputs a start instruction through the display unit 107, image formation onto the sheet is started.

In the personal printing, since the image formation is performed in a state where the user is present in the vicinity of the image forming apparatus 10, the user may obtain a printed matter immediately after the printed matter is output. In this case, it is difficult for a person other than the user to obtain the printed matter.

Here, when the personal printing is performed, the home screen shown in FIG. 2 is operated, and a "personal printing" selection button (not shown in FIG. 2) is selected by the user. Then, if the "personal printing" selection button is selected, the screen is switched to a display screen shown in FIG. 7 (that is a diagram showing a display screen after the "personal printing" is selected).

Here, on the display screen after switching shown in FIG. 7, file names of plural pieces of image data (printing jobs) stored in the storage unit 105 are displayed in a list form. In other words, the respective file names are displayed in a state of being arranged in the longitudinal direction. Further, on a left side of the file name in the figure, a preview screen indicating a state of a sheet after printing is displayed.

Here, if one of the plural files shown in FIG. 7 is selected, the screen is switched to a screen shown in FIG. 8 (that is a diagram showing a display screen after the file is selected). Here, on this display screen, setting items are displayed at a lower half part of the screen. Specifically, in this example, three setting items of "the number of copies", "color mode" and "both-side printing" are displayed.

Further, the file name is displayed at an upper right part of the display screen, and the preview screen indicating the state of the sheet after printing is displayed at an upper left part of the display screen. In the exemplary embodiment, each of the three setting items may be changed on the display screen shown in FIG. 8. If any setting item is changed, the preview screen is also changed according to the change. That is, in the exemplary embodiment, the preview screen is dynamically changed according to the change of the setting item.

Here, in the exemplary embodiment, as described above, the files are displayed in the list form in this way, and then, the user selects a desired file to be printed. Then, the selected file is printed.

Although not shown, in the exemplary embodiment, a "personal batch printing" selection button 21 is also prepared on the home screen, and if this selection button 21 is pressed, accumulated documents that are not yet output are printed in a batch by one-touch (without performing a different input operation). In other words, in the exemplary embodiment, two types of selection buttons 21 of "personal printing (list display)" and "personal batch printing" are prepared with respect to the personal printing.

However, in the image forming apparatus 10 of the exemplary embodiment, in addition to the selection buttons 21 that are prepared in advance, a new selection button 21 may be created by the user. In other words, in the exemplary embodiment, it is possible to create the selection button 21 (hereinafter, referred to as a "one-touch selection button 21") through which the process is started by performing selection of the selection button 21 once (by performing the input operation once instead of performing the input operation plural times). The "personal batch printing" selection button 21 corresponds to the one-touch selection button 21.

Here, when the user creates the one-touch selection button 21, a gear-shaped symbol (symbol indicated by reference numeral 9A) positioned at an upper right part in (A) of FIG. 9 (that is a diagram illustrating a display screen when the user creates the one-touch selection button 21) is pressed by the user. The display screen shown in (A) of FIG. 9 displays a screen in mail transmission. In other words, (A) of FIG. 9 shows a state after the "mail" selection button 21 shown in FIG. 2 is selected so that the display screen is switched.

Here, if the gear-shaped symbol is pressed, a display screen shown in (B) of FIG. 9 is displayed. Here, on this display screen, information necessary for the creation of the one-touch selection button 21 is input by the user. Specifically, a name (first row) and a name (second row) are input by the user. Here, in the one-touch selection button (one-touch selection button 21 after creation) of the exemplary embodiment, the names are displayed in two stages. The "name (first row)" represents a name displayed in the upper stage among two stages, and the "name (second row)" represents a name displayed in the lower stage among two stages.

Further, on the display screen shown in (B) of FIG. 9, a button (see reference numeral 9B) to be pressed by the user when changing a symbol of the one-touch selection button 21 (icon) is also displayed. If this button is pressed by the user, a screen shown in FIG. 10 (that is a diagram illustrating a list of the one-touch selection buttons 21) is displayed. Here, if the user selects one one-touch selection button 21 from the screen, the selected one one-touch selection button 21 is registered as a new one-touch selection button 21. Further, in the exemplary embodiment, the user may register an explanation. When registration of the explanation is desired, the user inputs the explanation in a box positioned at a lower part of the display screen (display screen shown in (B) of FIG. 9).

Here, if the user's input for the display screen shown in (B) of FIG. 9 is finished, the user presses a "create" button positioned at an upper right part in the figure. Thus, the display is switched into a display screen shown in (C) of FIG. 9, and a "one-touch mail transmission" one-touch selection button 21 is added on the display screen (on the home screen).

Hereinbefore, the process of creating the one-touch selection button 21 is described. However, in the exemplary embodiment, the user may create the selection button 21 for displaying a confirmation screen after selecting the selection button 21 and for executing the process by inputting a start button. The one-touch selection button 21 and the normal selection button 21 are formed to be distinguished from each other on the display screen. As indicated by reference numeral 9E in (C) of FIG. 9, a diamond-shaped mark is added to the one-touch selection button 21. In the exemplary embodiment, the start button for executing the process after the confirmation screen is displayed is disposed in a different place (not shown) of the image forming apparatus, instead of the display screen.

In the above description, the display process in the image forming apparatus 10 is described, but the display process may be similarly performed in a device (device such as a tablet terminal, for example) other than the image forming apparatus 10.

In the image forming apparatus 10 as an example of the processing device and the processing unit, a method of arranging setting items (FIG. 3) displayed on the display screen in a state where the first tab 3A is selected and setting items (FIG. 4) displayed on the display screen in a state where the second tab 3B is selected will be described with reference to FIGS. 3 and 4 illustrating the display screens after the selection button 21 of "copy" as an example of the process in FIG. 2 is selected (pressed) by a user.

Here, the display screen in the state where the first tab 3A is selected is referred to as the "display screen of the first tab 3A" as an example of the first screen, the setting items displayed thereon are referred to as the "setting items in the first tab 3A", the display screen in the state where the second tab 3B is selected is referred to as the "display screen of the second tab 3B" as an example of the second screen, and the setting items displayed thereon are referred to as the "setting items in the second tab 3B".

The display screen is a screen on which the setting items are arranged and means the entire screen including a part displayed on the display unit 107 as an example of the display unit and the selection unit and a part not displayed on the display unit 107. Here, the part not displayed may not be included in the display screen.

The setting items displayed on the display unit 107 also serve as the selection buttons 21 and are configured to change the conditions of the process corresponding to a setting item by causing a user to select (press) the setting item.

Here, the setting items in the first tab 3A are setting items (main setting items) having a high frequency at which the setting items is changed by a user, and the setting items in the second tab 3B are all setting items including the setting items in the first tab 3A. Accordingly, the setting items in the first tab 3A each have a large area on the display unit 107 and are displayed to be easily visually recognized and to be easily operated by a touch or the like. The setting items are displayed even without scrolling.

On the other hand, the setting items in the second tab 3B are displayed, for example, as a list on the display unit 107 and a hidden part is displayed by a scroll. At this time, out of the setting items in the first tab 3A, the setting items other than the setting items displayed in the first tab 3A are displayed when the display screen of the first tab 3A is switched to the display screen of the second tab 3B. In other words, the setting items in the first tab 3A are arranged at invisible positions when the display screen of the first tab 3A is switched to the display screen of the second tab 3B. The setting items in the first tab 3A are displayed more than those of the display screen of the first tab 3A and those in the display screen of the second tab 3B before being scrolled when the display screen of the first tab 3A is switched to the display screen of the second tab 3B, compared with the case where the setting items displayed in the first tab 3A are displayed. Therefore, on the display screen of the second tab 3B, it is preferable that the setting items in the first tab 3A be arranged at hidden positions on the display unit 107 and be displayed by scroll.

Here, a display in the initially-switched display screen is an example of the "preferential display" in the invention, but the "preferential display" is not limited to this and may be any display as long as a display has a relative intensity level, such as a display order, sizes of displayed items, and colors.

However, the setting items having a high frequency of change may vary depending on users and may also vary depending on print jobs.

Therefore, in this exemplary embodiment, the setting items in the first tab 3A may be changed by a user's instruction.

It may also be considered that an area in which the setting items in the first tab 3A are arranged on the display unit 107 is changed depending on the number of setting items to be arranged. However, when the number of setting items increases, the area in which each setting item should be arranged decreases and visibility and operability are damaged. Accordingly, in the display screen of the first tab 3A, it is preferable that the number of setting items to be arranged have an upper limit value S (where S is an integer equal to or greater than one and less than P).

(A) to (D) of FIG. 11 are diagrams illustrating an example of a relationship between the setting items in the first tab 3A and the setting items in the second tab 3B which are stored in a predetermined setting item storage area of the storage unit 105 and the setting items in the first tab 3A and the setting items in the second tab 3B which are displayed on the display unit 107. (A) of FIG. 11 illustrates the setting items in the first tab 3A stored in the setting item storage area of the storage unit 105, (B) of FIG. 11 illustrates the setting items in the first tab 3A displayed on the display unit 107, (C) of FIG. 11 illustrates the setting items in the second tab 3B stored in the setting item storage area, and (D) of FIG. 11 illustrates the setting items in the second tab 3B displayed on the display unit 107.

Here, the setting item storage area is disposed in the storage unit 105 as an example of the storage unit, but may be read from the storage unit 105 and may be disposed in the RAM 104 when the image forming apparatus 10 is started. The setting items stored in the setting item storage area are read by the CPU 102, and the display screen of the first tab 3A and the display screen of the second tab 3B are created and displayed on the display unit 107. The same is true of other cases.

Here, it is assumed that "copy" is exemplified and the total number of setting items is 13 (#1 to #13) (P, where P is an integer equal to or greater than two). For example, setting item #1 is "both-side/single-side/bookbinding" (with a priority of 5), setting item #2 is "number of copies" (with a priority of 1), setting item #3 is "N-up number (number of pages aggregated to one page) (which is described as "total 1 sheet (N-up)" in (A) to (D) of FIG. 12. The same is true in the following description)" (with a priority of 3), setting item #4 is "magnification" (with a priority of 6), setting item #5 is "color mode" (with a priority of 2), setting item #6 is "sheet selection" (with a priority of 4), setting item #7 is "original document setting direction designation" (with a priority of 7), setting item #8 is "density" (with a priority of 11), setting item #9 is "original document type" (with a priority of 8), setting item #10 is "ground color removal" (with a priority of 12), setting item #11 is "mixed size original document feeding" (with a priority of 9), setting item #12 is "stamp" (with a priority of 13), and setting item #13 is "paper fastener" (with a priority of 10). Setting items #1 to #13 will be described below. Priorities are set for setting items #1 to #13.

Here, it is assumed that the smaller the numeral becomes, the higher the priority becomes.

The priority will be described later.

As illustrated in (A) of FIG. 11, the setting items in the first tab 3A are stored in addresses A1 to A7 of the setting item storage area of the storage unit 105. That is, it is assumed that the limit value S (upper limit value) of the setting items in the first tab 3A is set to seven.

As illustrated in (A) of FIG. 11, setting items #1 to #6 are stored in addresses A1 to A6. The setting items stored in addresses A1 to A6 may not be arranged in the order of priorities.

As illustrated in (B) of FIG. 11, areas in which the setting items in the first tab 3A are displayed on the display unit 107 are determined to correspond to addresses A1 to A7. The number of setting items in the display screen of the first tab 3A is also set to seven. However, as illustrated in (A) of FIG. 11, since no setting item is stored in address A7, six (Q, where Q is an integer equal to or greater than 1 and less than P) setting items #1 to #6 stored in addresses A1 to A6 are displayed on the display unit 107.

On the other hand, the setting items in the second tab 3B are stored in addresses B1 to B13 of the setting item storage area of the storage unit 105. The setting items in the second tab 3B are all 13 (R, where R is an integer equal to or greater than 1, equal to or less than P, and greater than Q) setting items #1 to #13 including the setting items in the first tab 3A.

As illustrated in (C) of FIG. 11, setting items #1 to #6 in the first tab 3A are stored in upper-ranked addresses B8 to B13 out of addresses B1 to B13. Setting items #1 to #6 are sorted in the order of priorities and are stored in the order of setting items #2, #5, #3, #6, #1, and #4. Here, setting items #1 to #6 stored in addresses B8 to B13 may be stored in the reverse order of priorities.

Setting items #7 to #13 other than setting items #1 to #6 in the first tab 3A out all the setting items are stored in lower-ranked addresses B1 to B7. These setting items do not consider the priorities thereof and may not be arranged in the order of priorities.

As illustrated in (D) of FIG. 11, apart of setting items #7 to #12 of addresses B1 to B6 is displayed on the display unit 107, and setting items #13, #2, #5, #3, #6, #1, and #4 of addresses B7 to B13 are displayed by scroll.

Here, it is considered that setting item #8 ("density") in the second tab 3B is changed to a setting item in the first tab 3A.

At this time, a user selects setting item #8 with a finger or the like on the display screen of the second tab 3B and drags and drops the selected setting item to the first tab 3A.

Then, setting item #8 is copied to address A7 as a blank space and first data in which setting items #1 to #6 and #8 in the first tab 3A are arranged is created. The first data is stored in addresses A1 to A7 and the display screen of the first tab 3A is created. Then, setting items #1 to #6 and #8 are displayed on the display unit 107 (see (A) and (B) of FIG. 12).

The first data in which setting items #1 to #6 and #8 in the first tab 3A are arranged is sorted on the basis of the priorities and second data in which the setting items are arranged in the order of priorities is created. Third data in which setting items #7 and #9 to #13 other than setting items #1 to #6 and #8 in the first tab 3A out of all the setting items are arranged is created.

Fourth data in which the third data and the second data subsequent to the third data are arranged is created, the fourth data is stored in addresses B1 to B13, and the display screen of the second tab 3B is created. Then, setting items #7, #9 to #13, #1 to #6, and #8 are displayed on the display unit 107 (see (C) and (D) of FIG. 12).

In the above-mentioned example, since setting item #8 stored in address B2 comes out of addresses B1 to B7, setting items #9 to #13 stored in addresses B3 to B7 are moved up and are stored in addresses B2 to B6. The priority of setting item #8 is "11" and is lower than the priority of any of setting items #1 to #6 stored in addresses B8 to B13. Accordingly, setting item #8 is disposed subsequent to setting items #2, #5, #3, #6, #1, and #4 stored in addresses B8 to B13 and the setting items are stored in addresses B7 to B13.

(A) to (D) of FIG. 12 are diagrams illustrating an example of a relationship between the setting items in the first tab 3A and the setting items in the second tab 3B which are stored in the setting item storage area of the storage unit 105 and the setting items in the first tab 3A and the setting items in the second tab 3B which are displayed on the display unit 107 after a change. (A) of FIG. 12 illustrates the setting items in the first tab 3A stored in the setting item storage area of the storage unit 105, (B) of FIG. 12 illustrates the setting items in the first tab 3A displayed on the display unit 107, (C) of FIG. 12 illustrates the setting items in the second tab 3B stored in the setting item storage area, and (D) of FIG. 12 illustrates the setting items in the second tab 3B displayed on the display unit 107.

As illustrated in (A) of FIG. 12, setting items #1 to #6 and #8 are sequentially stored in addresses A1 to A7. As illustrated in (B) of FIG. 12, setting items #1 to #6 and #8 stored in addresses A1 to A7 are displayed in the areas corresponding to addresses A1 to A7 on the display unit 107.

As illustrated in (C) of FIG. 12, setting items #7 and #9 to #13 are stored in lower-ranked addresses B1 to B6 of addresses B1 to B13. Setting items #1 to #6 and #8 in the first tab 3A are stored in the order of priorities in upper-ranked addresses B7 to B13 of addresses B1 to b13. As illustrated in (D) of FIG. 12, setting items #7 and #9 to #13 corresponding to addresses B1 to B6 are displayed on the display unit 107 and setting items #2, #5, #3, #6, #1, #4, and #8 corresponding to addresses B7 to B13 are displayed by scroll.

It is described above that an area in which a setting item is not stored is present in the setting item storage area in which the setting items in the first tab 3A are stored in the storage unit 105. An example where an area in which a setting item is not stored is not present in the setting item storage area in which the setting items in the first tab 3A are stored will be described below.

(A) to (D) of FIG. 13 are diagrams illustrating another example of a relationship between the setting items in the first tab 3A and the setting items in the second tab 3B which are stored in the setting item storage area of the storage unit 105 and the setting items in the first tab 3A and the setting items in the second tab 3B which are displayed on the display unit 107. (A) of FIG. 13 illustrates the setting items in the first tab 3A stored in the setting item storage area of the storage unit 105, (B) of FIG. 13 illustrates the setting items in the first tab 3A displayed on the display unit 107, (C) of FIG. 13 illustrates the setting items in the second tab 3B stored in the setting item storage area, and (D) of FIG. 13 illustrates the setting items in the second tab 3B displayed on the display unit 107.

As illustrated in (A) of FIG. 13, setting items #1 to #6 and #13 are stored in addresses A1 to A7 in which the setting items in the first tab 3A are stored in the setting item storage area of the storage unit 105. As illustrated in (B) of FIG. 13, setting items #1 to #6 and #13 are displayed in the display area on the display unit 107 to correspond to addresses A1 to A7.

Since the number of setting items in the display screen of the first tab 3A is set to seven, there is no blank.

On the other hand, setting items #7 to #12 are stored in lower-ranked addresses B1 to B6 of addresses B1 to B13. Setting items #1 to #6 and #13 in the display screen of the first tab 3A are store in the order of priorities in upper-ranked addresses B7 to B13 of addresses B1 to B13. As illustrated in (D) of FIG. 13, setting items #7 to #12 corresponding to addresses B1 to B6 are displayed on the display unit 107, and setting items #2, #5, #3, #6, #1, #4, and #13 corresponding to addresses B7 to B13 are displayed by scroll.

Here, it is considered that setting item #8 ("density") in the second tab 3B is moved to the display screen of the first tab 3A.

At this time, the user selects setting item #8 on the display unit 107 on which the setting items in the second tab 3B are displayed and drags and drops the selected setting item to the first tab 3A.

However, since seven setting items are arranged already in the display screen of the first tab 3A, a new setting item is not arranged therein. Accordingly, setting item #13 having the lowest priority is deleted out of the setting items in the first tab 3A stored in addresses A1 to A7. Setting item #8 is copied to address #7 and first data in which setting items #1 to #6 and #8 in the first tab 3A are arranged is created. The first data is stored in addresses A1 to A7 and the display screen of the first tab 3A is created. Then, setting items #1 to #6 and #8 are displayed on the display unit 107 (see (A) and (B) of FIG. 12).

The first data in which setting items #1 to #6 and #8 in the first tab 3A are arranged is sorted on the basis of the priorities and second data in which the setting items are arranged in the order of priorities is created. Third data in which setting items #7 and #9 to #13 other than setting items #1 to #6 and #8 in the first tab 3A out of all the setting items are arranged is created.

Fourth data in which the third data and the second data subsequent to the third data are arranged is created, the fourth data is stored in addresses B1 to B13, and the display screen of the second tab 3B is created. Then, setting items #7 and #9 to #13 corresponding to addresses B1 to B6 are displayed on the display unit 107, and setting items #1 to #6 and #8 corresponding to addresses B7 to B13 are displayed by scroll (see (C) and (D) of FIG. 12).

This result is the same as illustrated in (A) to (D) of FIG. 12 and thus description thereof will not be repeated.

The method of changing the setting items in the first tab 3A and the second tab 3B described above will be described below with reference to a flowchart.

FIG. 14 is a flowchart illustrating the method of changing the setting items in the first tab 3A and the second tab 3B.

Here, it is assumed that the arrangement of the setting items is controlled by the CPU 102 of the control unit 100 as an example of the priority setting unit, the switching unit, and the changing unit.

First, on the display unit 107 on which the setting items in the second tab 3B are displayed, it is assumed that a setting item selected by a user is dragged and dropped to the first tab 3A. At this time, the selected setting item is identified on the basis of a signal for notifying that the setting item is dragged and dropped from the display unit 107 by the CPU 102 of the control unit 100 (step 11 which is described as S11 in FIG. 14. The same is true of the following description) (identification function).

Then, the CPU 102 of the control unit 100 determines whether the number of setting items displayed in the display screen of the first tab 3A reaches the upper limit value S (seven in (A) to (D) of FIG. 11 and (A) to (D) of FIG. 13) with reference to the setting item storage area ((A) of FIG. 11 and (A) of FIG. 13) of the storage unit 105 corresponding to the setting items in the first tab 3A (step 12). The case where the determination result of step 12 is positive (YES) will be described later.

When the determination result of step 12 is negative (NO), that is, when the number of setting items in the display screen of the first tab 3A does not reach the upper limit value S, the selected setting item is added to the setting items in the first tab 3A. That is, the selected setting item is stored in the address in which no setting item is stored in the corresponding setting item storage area, and the setting items in the first tab 3A are updated (step 13). Subsequently, the display order of the setting items in the second tab 3B is changed and the setting items in the second tab 3B are updated (step 14). The flowchart illustrating the method of changing the display order of the setting items in the second tab 3B will be described later.

By the CPU 102 of the control unit 100, data (first data and fourth data) of the setting items in the first tab 3A and the setting items in the second tab 3B are stored in the storage unit 105 (step 15). Since the data (first data and fourth data) of the setting items in the first tab 3A and the setting items in the second tab 3B are stored in the storage unit 105, the stored data (the first data and the fourth data) are read at the time of subsequently starting the image forming apparatus 10, and the display screen of the first tab 3A and the display screen of the second tab 3B are created (creation function).

Whether to store the data of the setting items in the storage unit 105 may be determined by a user's selection.

Then, when the determination result of step 12 is positive (YES), that is, when the number of setting items in the first tab 3A reaches the upper limit value S, the setting item selected out of the setting items in the second tab 3B is interchanged with the setting item having a low priority out of the setting items in the first tab 3A (step 16).

Then, the processes of step 14 and step 15 are performed.

The flowchart illustrating the method of changing the display order of the setting items in the display screen of the second tab 3B will be described below.

FIG. 15 is a flowchart illustrating the method of changing the display order of the setting items in the display screen of the second tab 3B.

The first data in which the setting items in the first tab 3A are arranged is created (step 21). The display screen of the first tab 3A is created on the basis of the first data.

Then, the setting items in the first data are sorted with the priorities and second data in which the setting items are arranged in the order of priorities is created (step 22).

Third data in which the setting items other than the setting items in the first tab 3A out of all the setting items are arranged is created (step 23).

The fourth data in which the third data and the second data subsequent to the third data are arranged is created (step S24).

The display screen of the second tab 3B is created on the basis of the fourth data.

As described above, in this exemplary embodiment, the setting items are classified into the setting items of two screens, that is, the setting items in the display screen of the first tab 3A and the setting items in the display screen of the second tab 3B.

When the setting items in the first tab 3A are displayed on the display unit 107, the setting items may be visually recognized without scrolling (without moving an image). On the other hand, when the setting items in the second tab 3B are displayed on the display unit 107, the setting items may be visually recognized by scrolling (by moving an image).

When the setting items in the second tab 3B are displayed on the display unit 107, the setting item selected by a user may be added to the setting items in the first tab 3A. That is, the setting items may be customized. Accordingly, the user may classify the setting items.

When a setting item in the second tab 3B is added to the setting items in the first tab 3A and the setting item is a setting item arranged at a visible position at the time of switching the display screen of the first tab 3A to the display screen of the second tab 3B, the arrangement position thereof is changed to an invisible position and the other setting items are arranged at visible positions. In addition, the user may change the order of the setting items in the second tab 3B.

It is preferable that the setting items in the first tab 3A be displayed to be larger than the setting items in the second tab 3B. Accordingly, it is easier to visually recognize the setting items in the first tab 3A which are the setting items frequently used.

The setting items in the first tab 3A and the setting items in the second tab 3B may be stored by each of the users. Accordingly, a user does not need to set conditions depending on the setting items fixed and arranged in the image forming apparatus 10 or the setting items arranged by another user.

That is, since a user may select the setting items in the first tab 3A and the setting items in the second tab 3B, it is possible to more easily operate the image forming apparatus 10.

The setting items in the first tab 3A may be deleted by a user. For example, a setting item may be selected and dragged and dropped to the second tab 3B by the user.

In (C) of FIG. 11, the setting items in the second tab 3B are the total setting items. In this case, all the setting items may be set using only the setting items arranged in the display screen of the second tab 3B.

On the other hand, the setting items in the second tab 3B may be the setting items other than the setting items in the first tab 3A out of all the setting items. In this case, it is possible to reduce the number of setting items arranged in the display screen of the second tab 3B.

At the time of startup, the display screen of the first tab 3A may be first displayed or the display screen of the second tab 3B may be first displayed by predetermined setting.

An example where the setting items in the second tab 3B are the setting items other than the setting items in the first tab 3A out of all the setting items will be described below.

(A) to (D) of FIG. 16 are diagrams illustrating still another example of the relationship between the setting items in the first tab 3A and the setting items in the second tab 3B which are stored in the setting item storage area of the storage unit 105 and the setting items in the first tab 3A and the setting items in the second tab 3B which are displayed on the display unit 107. (A) of FIG. 16 illustrates the setting items in the first tab 3A stored in the setting item storage area of the storage unit 105, (B) of FIG. 16 illustrates the setting items in the first tab 3A displayed on the display unit 107, (C) of FIG. 16 illustrates the setting items in the second tab 3B stored in the setting item storage area, and (D) of FIG. 16 illustrates the setting items in the second tab 3B displayed on the display unit 107.

As illustrated in (A) of FIG. 16, setting items #1 to #6 are stored in addresses A1 to A6 of the setting item storage area of the storage unit 105. However, no setting item is stored in address A7. As illustrated in (B) of FIG. 16, setting items #1 to #6 are displayed in the area in which the setting items are displayed in the display screen of the first tab 3A to correspond to addresses A1 to A6. However, as illustrated in (A) of FIG. 16, since no setting item is stored in address A7, the area corresponding to address A7 in the display screen of the first tab 3A is blank.

As illustrated in (C) of FIG. 16, setting items #7 to #13 other than setting items #1 to #6 in the first tab 3A out of thirteen setting items are stored in addresses B1 to B7. Here, setting items #7 to #13 are not sorted in the order of priorities, but may be stored in the order of priorities.

As illustrated in (D) of FIG. 16, setting items #7 to #13 corresponding to addresses B1 to B7 are displayed in the display screen of the second tab 3B. On the display unit 107, setting items #7 to #12 corresponding to addresses B1 to B6 are displayed and setting item #13 corresponding to address B7 is displayed by scrolling the display screen of the second tab 3B.

Here, the number of setting items is set to thirteen and the number of setting items in the first tab 3A is set to seven, but the number of setting items in the second tab 3B is set to be larger than the number of setting items in the first tab 3A. That is, the thirteen setting items exemplified therein are a part of setting items and it is assumed that the number of setting items in the second tab 3B other than the seven setting items in the first tab 3A is greater than seven.

Here, it is considered that setting item #8 ("density") in the second tab 3B is changed to be added to the setting items in the first tab 3A.

At this time, the user selects setting item #8 in the display screen of the second tab 3B and drags and drops the selected setting item to the first tab 3A.

Then, setting item #8 is stored in address A7 in which no setting item is stored, and first data in which setting items #1 to #6 and #8 in the first tab 3A are arranged is created. On the basis of the first data, setting items #1 to #6 and #8 are stored in addresses A1 to A7 and the display screen of the first tab 3A is created. Then, setting items #1 to #6 and #8 are displayed on the display unit 107 (see (A) and (B) of FIG. 17).

Third data in which setting items #7 and #9 to #13 in the second tab 3B are arranged is created. On the basis of the third data, setting items #7 and #9 to #13 are stored in addresses B1 to B6 and the display screen of the second tab 3B is created. Then, setting items #7 and #9 to #13 are displayed on the display unit 107 (see (C) and (D) of FIG. 17).

The third data is the same as the third data (the setting items other than the setting items in the first tab 3A out of all the setting items) described with reference to (A) to (D) of FIG. 11 and thus is referred to as third data.

(A) to (D) of FIG. 17 are diagrams illustrating another example of the relationship between the setting items in the first tab 3A and the setting items in the second tab 3B which are stored in the setting item storage area of the storage unit 105 and the setting items in the first tab 3A and the setting items in the second tab 3B which are displayed on the display unit 107 after a change. (A) of FIG. 17 illustrates the setting items in the first tab 3A stored in the setting item storage area of the storage unit 105, (B) of FIG. 17 illustrates the setting items in the first tab 3A displayed on the display unit 107, (C) of FIG. 17 illustrates the setting items in the second tab 3B stored in the setting item storage area, and (D) of FIG. 17 illustrates the setting items in the second tab 3B displayed on the display unit 107.

Setting items #1 to #6 and #8 are stored in addresses A1 to A7 as illustrated in (A) of FIG. 17, and setting items #1 to #6 and #8 corresponding to addresses A1 to A7 are displayed on the display unit 107 as illustrated in (B) of FIG. 17.

Setting items #7 and #9 to #13 are stored in addresses B1 to B6 as illustrated in (C) of FIG. 17, and setting items #7 and #9 to #13 corresponding to addresses B1 to B6 are displayed on the display unit 107 as illustrated in (D) of FIG. 17. The hidden setting items on the display unit 107 are displayed by scrolling the display screen of the second tab 3B.

An example where an address in which no setting item is stored is present in the setting items in the first tab 3A is described above. An example where an address in which no setting item is stored is not present in the setting items in the first tab 3A will be described below.

(A) to (D) of FIG. 18 are diagrams illustrating still another example of the relationship between the setting items in the first tab 3A and the setting items in the second tab 3B which are stored in the setting item storage area of the storage unit 105 and the setting items in the first tab 3A and the setting items in the second tab 3B which are displayed on the display unit 107. (A) of FIG. 18 illustrates the setting items in the first tab 3A stored in the setting item storage area of the storage unit 105, (B) of FIG. 18 illustrates the setting items in the first tab 3A displayed on the display unit 107, (C) of FIG. 18 illustrates the setting items in the second tab 3B stored in the setting item storage area, and (D) of FIG. 18 illustrates the setting items in the second tab 3B displayed on the display unit 107.

Setting items #1 to #6 and #13 are stored in addresses A1 to A7 as illustrated in (A) of FIG. 18, and setting items #1 to #6 and #13 corresponding to addresses A1 to A7 are displayed on the display unit 107 as illustrated in (B) of FIG. 18. Accordingly, there is no blank.

Setting items #7 to #12 are stored in addresses B1 to B6 as illustrated in (C) of FIG. 18, and setting items #7 to #12 corresponding to addresses B1 to B6 are displayed on the display unit 107 as illustrated in (D) of FIG. 18.

Here, it is considered that setting item #8 ("density") in the second tab 3B is moved to the display screen of the first tab 3A.

At this time, the user selects setting item #8 in the display screen of the second tab 3B and drags and drops the selected setting item to the first tab 3A.

However, seven setting items which are the upper limit S are arranged in the display screen of the first tab 3A. Accordingly, setting item #13 having the lowest priority out of the setting items in the first tab 3A stored in addresses A1 to A7 is interchanged with setting item #8 in the second tab 3B (see (A) to (C) of FIG. 19).

Then, first data in which setting items #1 to #6 and #8 in the first tab 3A are arranged is created. On the basis of the first data, setting items #1 to #6 and #8 are stored in addresses A1 to A7 and the display screen of the first tab 3A is created. Then, setting items #1 to #6 and #8 are displayed on the display unit 107 (see (A) and (B) of FIG. 19).

Third data in which setting items #7, #13, and #9 to #12 in the second tab 3B are arranged is created. On the basis of the third data, setting items #7, #13, and #9 to #12 are stored in addresses B1 to B6 and the display screen of the second tab 3B is created. Then, setting items #7, #13, and #9 to #12 are displayed on the display unit 107 (see (C) and (D) of FIG. 19).

(A) to (D) of FIG. 19 are diagrams illustrating still another example of the relationship between the setting items in the first tab 3A and the setting items in the second tab 3B which are stored in the setting item storage area of the storage unit 105 and the setting items in the first tab 3A and the setting items in the second tab 3B which are displayed on the display unit 107 after a change. (A) of FIG. 19 illustrates the setting items in the first tab 3A stored in the setting item storage area of the storage unit 105, (B) of FIG. 19 illustrates the setting items in the first tab 3A displayed on the display unit 107, (C) of FIG. 19 illustrates the setting items in the second tab 3B stored in the setting item storage area, and (D) of FIG. 19 illustrates the setting items in the second tab 3B displayed on the display unit 107.

Setting items #1 to #6 and #8 are stored in addresses A1 to A7 as illustrated in (A) of FIG. 19, and setting items #1 to #6 and #8 corresponding to addresses A1 to A7 are displayed on the display unit 107 as illustrated in (B) of FIG. 19.

Setting items #7, #13, and #9 to #12 are stored in addresses B1 to B6 as illustrated in (C) of FIG. 19, and setting items #7, #13, and #9 to #12 corresponding to addresses B1 to B6 are displayed on the display unit 107 as illustrated in (D) of FIG. 19. The hidden setting items on the display unit 107 are displayed by scrolling the display screen of the second tab 3B.

The method of changing the setting items in the first tab 3A and the second tab 3B when the setting items in the second tab 3B are the setting items other than the setting items in the first tab 3A out of all the setting items will be described with reference to a flowchart.

FIG. 20 is a flowchart illustrating another method of changing the setting items in the first tab 3A and the second tab 3B. The same steps as in the flowchart illustrated in FIG. 14 will be reference by the same reference signs and description thereof will not be repeated. The flowchart illustrated in FIG. 20 includes the steps illustrated in FIG. 15.

Here, step 14 of FIG. 14 is replaced with step 14' and step 15 is replaced with steps 31 to 33. After step 16 is performed, step 31 is performed.

That is, when the determination result of step 12 is negative (NO), that is, when the number of setting items displayed in the display screen of the first tab 3A does not reach the upper limit value S, the selected setting item is added to the setting items in the first tab 3A. That is, in the corresponding setting item storage area, the selected setting item is stored in an address in which no setting item is stored to update the setting items in the first tab 3A (step 13).

The selected setting item is deleted from the setting items in the second tab 3B to update the setting items in the second tab 3B (step 14').

The first data in which the setting items in the first tab 3A are arranged is created (step 31).

The third data in which the setting items in the second tab 3B are arranged is created (step 32). The third data is the same as the third data (the setting items other than the setting items in the first tab 3A out of all the setting items) created in step 23 of FIG. 15 and thus is referred to as third data.

The data (the first data and the third data) of the setting items in the first tab 3A and the setting items in the second tab 3B are stored in the storage unit 105 (step 33).

The setting items in the first tab 3A may be moved to the setting items in the second tab 3B by a user. For example, a selected item may be selected and dragged and dropped to the second tab 3B by the user.

The total number of setting items is described to be thirteen, but is not limited to thirteen. The upper limit value S of the number of setting items in the first tab 3A is not limited to seven.

The priority may be the number of times (frequency) at which the setting of the respective setting items is changed by a user in a predetermined period of time or may be the number of times at which the respective setting items are used for a user's work. The priority of the respective setting items may be designated by a user. That is, the priority may vary with the lapse of time.

The setting item to be deleted from the display screen of the first tab 3A when interchanging the setting item in the first tab 3A with the selected setting item in the second tab 3B in step 16 of FIGS. 14 and 20 is determined above on the basis of the priority, but the setting item to be deleted may be designated by a user. For example, the setting item may be moved to the display screen of the first tab 3A and may be designated by a user's touch.

The third data created in step 23 of FIG. 15 and step 32 of FIG. 20 is not sorted on the basis of the priorities. However, the third data may be sorted on the basis of the priorities and may be arranged in the order or the reverse order of the priorities to rearrange the third data.

Similarly, the display screen of the first tab 3A created on the basis of the first data may be created on the basis of data obtained by sorting the first data in the order or the reverse order of the priorities.

The "copy" function in the image forming apparatus 10 is described above as an example. The above-mentioned configuration may be applied to the other functions. For example, in the function of "store in box", the setting items such as "color mode", "transmission of both-side document", and "reading resolution" displayed along with the selection buttons 21 having a user name added thereto in the display screen of the first tab 5A illustrated in FIG. 5 may be changed to the setting items such as "file name", "document setting direction", and "density" in the display screen of the second tab 5B illustrated in (A) and (B) of FIG. 6.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    at least one hardware processor configured to implement:
        a processing unit that performs a predetermined process for forming an image;
        a display unit that controls a display to display at least an icon related to a certain process, a first screen and a second screen which are displayed after selecting the icon, the first screen displays Q (where Q is an integer equal to or greater than one and less than R) setting items, the second screen displays R (where R is an integer equal to or greater than one, and greater than Q) setting items; and
        a switching unit that switches a display screen to be displayed on the display unit between the first screen and the second screen based on a user's instruction,
    wherein the first screen is configured not to be scrolled and the second screen is scrollable,
    wherein the first screen and the second screen are nested hierarchically under the icon such that the icon directs to one of the first screen and the second screen and the one of the first screen and the second screen directs to the other of the first screen and the second screen
    wherein the display unit further controls the display to display a setting image which is displayed at a part of the first screen separate from the Q setting items and as a representation of a combination of values of setting items which have been selected,
    wherein setting items other than the setting items displayed on the first screen out of the setting items displayed on the second screen are arranged at initial display positions that are initially displayed on the display unit when a displayed screen is instructed to switch from the first screen to the second screen,
    wherein the at least one hardware processor is further configured to implement,
        a selection unit configured to allow the user to select a setting item not included in the setting items displayed on the first screen out of the setting items displayed on the second screen to be displayed on the first screen, and
        a changing unit configured to change the first screen to display the setting item selected by the selection unit on the first screen,
    wherein a number of setting items capable to be displayed on the first screen has an upper limit value S (where S is an integer equal to or greater than one and less than an integer P),
    wherein upon changing the first screen, the changing unit adds the setting item selected on the second screen by the user to the setting items displayed on the first screen when a number of setting Q displayed on the first screen is less than the upper limit value S, and interchanges the setting item selected on the second screen by the user with one of the setting items displayed on the first screen when a number of setting items Q displayed on the first screen is equal to the upper limit value S,
    wherein the at least one hardware processor is farther configured to implement;
        a priority setting unit configured to set priorities for setting items according to numbers of times that ones of the setting items are selected; and
        a storage unit configured to control a memory to store the setting items and the priorities corresponding to the setting items, and
    wherein the one of the setting items, displayed on the first screen and interchanged with the setting item selected by the user when the changing unit changes the first screen, has a lowest priority.

2. The image forming apparatus according to claim 1, wherein
    the first screen is configured to display the Q setting items without scrolling and the second screen is configured to be scrollable.

3. The image forming apparatus according to claim 1, wherein
    each of the Q setting items displayed on the first screen is displayed to be larger than each of the R setting items displayed on the second screen.

4. The image forming apparatus according to claim 1, wherein
    the first screen includes a selection image used to select a storing destination of read image data.

5. The image forming apparatus according to claim 1, wherein
    the selected setting item is displayed on the first screen in a different displaying format than on the second screen.

6. The image forming apparatus according to claim 1, wherein
    a plurality of setting items are displayed in a list format by the second screen, and
    the changing unit is further configured to cause the plurality of setting items of the second screen to be moved to the first screen and to be displayed larger by the first screen than by the second screen,
    the moved plurality of setting items displayed on the first screen are not displayed in the list format by the first screen.

7. The image forming apparatus according to claim 1, wherein the certain process consists of one of a copy mode, a scan mode, a print mode and a mail mode.

8. The image forming apparatus according to claim 1, wherein
    the display unit is configured to display a plurality of screens consisting of the second screen and ones of a plurality of user-specific first screens consisting of the first screen modified according to respective ones of a plurality of users.

9. The image forming apparatus according to claim 1, wherein the icon directs to a window comprising the one of the first screen and the second screen, and
    in a case that a display of the one of the first screen and the second screen is directed to the other of the first screen and the second, the second screen is displayed in the window.

10. The image forming apparatus according to claim 9, wherein a descendant hierarchy from the icon consists of the first screen and the second screen.

11. The image forming apparatus according to claim 1, wherein Q is less than P (where P is an integer equal to or greater than two) of P setting items, and R is equal to or less than P, and all of the P setting items are capable to be set using the Q setting items displayed on the first screen and the R setting items displayed on the second screen.

12. The image forming apparatus according to claim 11, wherein all user configurable functions of a mode of operation of the image forming apparatus consist of the P setting items.

13. The image forming apparatus according to claim 1, wherein the second screen is displayed via the first screen.

14. The image forming apparatus according to claim 1, wherein a selected image of one of the first screen and the second screen directs to the other of the first screen and second screen.

15. The image forming apparatus according to claim 1, wherein the setting image is configured to change for different combinations of the setting items.

16. The image forming apparatus according to claim 1,
wherein the display unit comprises a liquid crystal display touch panel,
wherein the display unit is configured to digitally display the icon on the liquid crystal display touch panel, and
wherein the second screen is scrollable in an up-down direction of the second screen.

17. A processing device comprising:
at least one hardware processor is configured to implement
a processing unit configured that performs a predetermined process;
a display unit that controls a display to display at least an icon related to a certain process, a first screen and a second screen which are displayed after selecting the icon, the first screen displays Q (where Q is an integer equal to or greater than one and less than R) setting items the second screen displaying R (where R is an integer equal to or greater than one, and greater than Q) setting items; and
a switching unit that switches a display screen to be displayed on the display unit between the first screen and the second screen based on a user's instruction,
wherein the first screen is configured not to be scrolled and the second screen is scrollable,
wherein the first screen and the second screen are nested hierarchically under the icon such that the icon directs to one of the first screen and the second screen and the one of the first screen and the second screen directs to the other of the first screen and the second screen,
wherein the display unit further controls the display to display a setting image which is displayed at a part of the first screen separate from the Q setting items and as a representation of a combination of values of setting items which have been selected,
wherein setting items other than the setting items displayed on the first screen out of the setting items displayed on the second screen are arranged at initial display positions that are initially displayed on the display unit when a displayed screen is instructed to switch from the first screen to the second screen,
wherein the at least one hardware processor is further configured to implement;
a selection unit configured to allow the user to select a setting item not included in the setting items displayed on the first screen out of the setting items displayed on the second screen to be displayed on the first screen; and
a changing unit configured to change the first screen to display the setting item selected by the selection unit on the first screen,
wherein a number of setting items capable to be displayed on the first screen has an upper limit value S (where S is an integer equal to or greater than one and less than an integer P),
wherein upon changing the first screen, the changing unit adds the setting item selected on the second screen by the user to the setting items displayed on the first screen when a number of setting items Q displayed on the first screen is less than the upper limit value S, and interchanges the setting item selected on the second screen by the user with one of the setting items displayed on the first screen when a number of setting items Q displayed on the first screen is equal to the upper limit value S,
wherein the at least one hardware processor is further configured to implement;
a priority setting unit configured to set priorities for setting items according to numbers of times that ones of the setting items are selected; and
a storage unit configured to control a memory to store the setting items and the priorities corresponding to the setting items, and
wherein the one of the setting items, displayed on the first screen and interchanged with the setting item selected by the user when the changing unit changes the first screen has a lowest priority.

18. The processing device according to claim 17, wherein the first screen is configured to display the Q setting items without scrolling and the second screen is configured to be scrollable.

19. The processing device according to claim 17, wherein each of the Q setting items displayed on the first screen is displayed to be larger than each of the R setting items displayed on the second screen.

20. A non-transitory computer-readable medium storing a program causing a computer to achieve:
a creation function of displaying at least an icon related to a certain process, and creating a first screen, displaying Q (where Q is an integer equal to or greater than one and less than R) setting items and a second screen displaying R (where R is an integer equal to or greater than one, and greater than Q) setting items;
an identification function of identifying a selected setting item when a setting item not included in the Q setting items displayed on the first screen out of the R setting items displayed on the second screen is selected to be displayed on the first screen by a user;
a changing function of changing setting items displayed on the first screen to display the selected setting item on the first screen,
wherein the first screen is configured not to be scrolled and the second screen is scrollable,
wherein the first screen and the second screen are nested hierarchically under the icon such that the icon directs to one of the first screen and the second screen and the one of the first screen and the second screen directs to the other of the first screen and the second screen,
wherein a setting image is displayed at a part of the first screen separate from the Q setting items and as a representation of a combination of values of setting items which have been selected,
wherein setting items other than the setting items displayed on the first screen out of the setting items displayed on the second screen are arranged at initial display positions that are initially displayed on the display unit when a displayed screen is instructed to switch from the first screen to the second screen, wherein the program is further configured to cause the computer to achieve;

allowing the user to select a setting item not included in the setting items displayed on the first screen out of the setting items displayed on the second screen to be displayed on the first screen; and changing the first screen to display the setting item selected by the selection unit on the first screen, wherein a number of setting items capable to be displayed on the first screen has an upper limit value S (where S is an integer equal to or greater than one and less than an integer P), wherein upon changing the first screen, adding the setting item selected on the second screen by the user to the setting items displayed on the first screen when a number of setting items Q displayed on the first screen is less than the upper limit value S, and interchanges the setting item selected on the second screen by the user with one of the setting items displayed on the first screen when a number of setting items Q displayed on the first screen is equal to the upper limit value S, wherein the program is further configured to cause the computer to achieve, setting priorities for setting items according to numbers of times that ones of the setting items are selected; and controlling a memory to store the setting items and the priorities corresponding to the setting items, and wherein the one of the setting items, displayed on the first screen and interchanged with the setting item selected by the user when the changing unit changes the first screen, has a lowest priority.

21. A processing device comprising:

a hardware processor configured to implement:

a display unit configured to display at least an icon related to a certain process of the processing device, a parameter screen configured to set parameters of the process, and a first screen and a second screen which are displayed after selecting the icon;

wherein the parameter screen is further configured to include the first screen, displaying first setting items and the second screen displaying second setting items, wherein the first screen is configured not to be scrolled and the second screen is scrollable, wherein the first screen and the second screen are nested hierarchically under the icon such that the icon directs to one of the first screen and the second screen and the one of the first screen and the second screen directs to the other of the first screen and the second screen, and wherein a setting image is displayed at a part of the first screen separate from the first setting items and as a representation of a combination of values of first setting items which have been selected, wherein setting items other than the first setting items displayed on the first screen out of the second setting items displayed on the second screen are arranged at initial display positions that are initially displayed on the display unit when a displayed screen is instructed to switch from the first screen to the second screen, wherein the at least one hardware processor is further configured to implement;

a selection unit configured to allow the user to select a setting item not included in the first setting items displayed on the first screen out of the second setting items displayed on the second screen to be displayed on the first screen; and a changing unit configured to change the first screen to display the setting item selected by the selection unit on the first screen, wherein a number of setting items capable to be displayed on the first screen has an upper limit value S (where S is an integer equal to or greater than one and less than an integer P), wherein upon changing the first screen, the changing unit adds the setting item selected on the second screen by the user to the first setting items displayed on the first screen when a number of setting items Q displayed on the first screen is less than the upper limit value S, and interchanges the setting item selected on the second screen by the user with one of the first setting items displayed on the first screen when a number of setting item a Q displayed on the first screen is equal to the upper limit value S, wherein the at least one hardware processor is further configured to implement;

a priority setting unit configured to set priorities for setting items according to numbers of times that ones of the setting items are selected; and a storage unit configured to control a memory to store the setting items and the priorities corresponding to the setting items, and wherein the one of the first setting items, displayed on the first screen and interchanged with the setting item selected by the user when the changing unit changes the first screen, has a lowest priority.

* * * * *